United States Patent
Hoshida et al.

(10) Patent No.: US 7,792,436 B2
(45) Date of Patent: Sep. 7, 2010

(54) OPTICAL RECEIVER CORRESPONDING TO DIFFERENTIAL M-PHASE SHIFT KEYING SYSTEM

(75) Inventors: Takeshi Hoshida, Kawasaki (JP); Nobuhiro Fukushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 849 days.

(21) Appl. No.: 11/391,414

(22) Filed: Mar. 29, 2006

(65) Prior Publication Data

US 2006/0222377 A1  Oct. 5, 2006

(30) Foreign Application Priority Data

Mar. 31, 2005  (JP)  ............................. 2005-103303

(51) Int. Cl.
H04B 10/06 (2006.01)
(52) U.S. Cl. .................... 398/212; 398/207; 398/211
(58) Field of Classification Search ................ 398/191, 398/202, 207, 209, 211–214, 206
See application file for complete search history.

(56) References Cited

U.S. PATENT DOCUMENTS

| 5,295,013 A | 3/1994 | Ono |
| 5,317,382 A | 5/1994 | Miyazaki et al. |
| 5,319,438 A | 6/1994 | Kiasaleh |
| 5,355,243 A | 10/1994 | King |
| 5,432,629 A | 7/1995 | Shikada et al. |
| 6,888,887 B1 * | 5/2005 | Shattil ........................ 375/239 |
| 2004/0081470 A1 * | 4/2004 | Griffin ........................ 398/188 |
| 2006/0056845 A1 * | 3/2006 | Parsons et al. ................ 398/41 |

FOREIGN PATENT DOCUMENTS

| GB | 2259419 A | 3/1993 |
| GB | 2385144 A | 8/2003 |
| JP | 04-198927 | 7/1992 |
| JP | 2004-170954 | 6/2004 |
| JP | 2004-516743 | 6/2004 |

OTHER PUBLICATIONS

Japanese Patent Office Action dated Dec. 1, 2009 for corresponding Japanese Application No. 2005-103303.

* cited by examiner

*Primary Examiner*—Dzung D Tran
(74) *Attorney, Agent, or Firm*—Staas & Halsey LLP

(57) ABSTRACT

A small size and low cost optical receiving apparatus, which can stably demodulate the signal, lights in accordance with the differential M-phase shift keying (DMPSK) system. An optical receiving apparatus comprises a light branching unit for branching the differential M-phase shift keying signal beam into four signal light beams, a delay adjusting unit giving a delay time difference of one symbol between a first signal light beam and a second signal light beam and between a third signal light beam and a fourth signal light beam, a demodulating unit for outputting a least two demodulated light signals through respective interferences between the first signal light beam and the second signal light beam, and between the third signal light beam and the fourth signal light beam on one plane which is not parallel to any signal light beam, and at least two optical detectors for converting at least two light signals into electrical signals.

15 Claims, 20 Drawing Sheets

Fig. 16

| MODULATION SYSTEM<br>EVALUATION ITEM | NRZ | Duobinary | CS-RZ | RZ-DPSK | RZ-DQPSK |
|---|---|---|---|---|---|
| SHAPE OF LIGHT SPECTRUM | 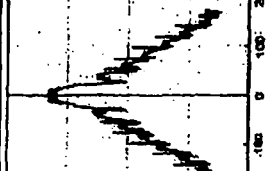 | 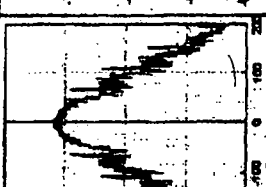 | 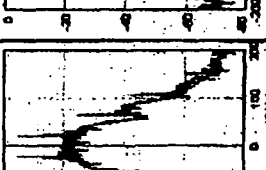 |  | 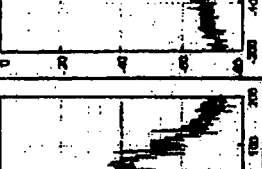 |
| OPTICAL NOISE TOLERANCE | △ | △ | □ | ○ | ◉ |
| CHROMATIC DISPERSION TOLERANCE | □ | ○ (IN THE LINEAR REGION) | □ | □ | ○ |
| PMD TOLERANCE | △ | □ | □ | ○ | ○ |
| OPTICAL NON-LINEAR TOLERANCE | □ | △ | ◉ | ○ | ○ |
| OADM FILTER PASSING STRENGTH | ○ | ◉ | □ | □ | ◉ |
| STRUCTURE (SIZE/COST) | ○ | △ | □ | △ | △ |

EVALUATION SYMBOL    △:BAD    □:RATHER GOOD    ○:GOOD    ◉:VERY GOOD

OPTICAL RECEIVER CORRESPONDING TO DIFFERENTIAL M-PHASE SHIFT KEYING SYSTEM

FIELD OF THE INVENTION

The present invention relates to an optical receiver for demodulating the signal light of the differential M-phase shift keying and particularly to a technique for realizing a small size optical receiver of the DQPSK ensuring stable operation.

BACKGROUND OF THE INVENTION

In recent years, attention has been paid, for example, to the optical modulation system such as the differential binary phase shift keying (DBPSK or DPSK) or the differential quadrature phase shift keying (DQPSK) as the technique for enabling high bit rate optical transmission of 40 Gb/s or more per wavelength.

As the requirement of the optical modulation system in the photonic network corresponding to high bit rate, it is expected to have the excellent characteristics for the technical items listed up, for example, in regard to optical noise tolerance, chromatic dispersion tolerance, polarization mode dispersion tolerance, optical non-linear tolerance, OADM filter passing tolerance and transceiver size/cost or the like. Particularly, the system ensuring optical noise tolerance and chromatic dispersion tolerance can be said to be more suitable for long-range optical communication. Moreover, the DQPSK system explained above has been verified, from the result of simulation or the like, to show more excellent characteristics in regard to many factors of the technical elements listed up in comparison with the well known ordinary non-return-to-zero (NRZ) modulation, carrier-suppressed return-to-zero (CS-RZ) modulation system, and DPSK modulation system.

As a practical example, FIG. 16 illustrates a comparison result in each modulation system of the optical noise tolerance, chromatic dispersion tolerance and PMD tolerance in regard to the optical modulation system of NRZ, Duo-binary, CS-RZ, RZ-DPSK, and RZ-DQPSK. Moreover, FIG. 17 illustrates simulation result in regard to the passing tolerance of wavelength combining/branching filters (for example, OADM).

The DQPSK modulation system in this specification is assumed to include the RZ-DQPSK system in which the DQPSK signal is converted to the return-to-zero (RZ) pulse in its intensity waveform and the carrier-suppressed (CS) RZ-DQPSK system. Moreover, the technique disclosed in this specification can be adapted to the differential M-phase shift keying system including the DMPSK (M=2n) such as D8PSK.

Here, an optical transmitter and an optical receiver introducing the DQPSK system will be explained briefly.

As the optical transmitter introducing the DQPSK system, the optical transmitter having the basic structure illustrated, for example, in FIG. 18 is known (for example, patent document 1). In this optical transmitter, a continuous light emitted from a light source 500 is branched into two light beams and one branched light is applied to a phase modulator (PM) 510, while the other branched light to a phase modulator (PM) 513 via a delay unit 512. Each phase modulator 510, 513 is independently driven in accordance with the modulation signal generated by processing different data signals D1, D2 with the process in a pre-coder (integrator) 531 in order to selectively change the phase of each input light by 0 or π [radian]. Details of pre-coder and modulation are explained in the patent document 1. Since the input light to the phase modulator 513 is given a phase difference as much as π/2 by the delay unit 512 for the input light to the phase modulator 510, an output light from the phase modulator 510 becomes the light signal obtained by modulating the light from the light source 500 through phase shift of 0 or π, while an output light from the phase modulator 513 becomes the light signal obtained by modulating the light from the light source 500 through phase shift of π/2 or 3π/2. Since the output lights of the phase modulators 510, 513 are combined, the DQPSK signal light which change in the phase in the four values of π/4, 3π/4, 5π/4, and 7π/4 can be generated. Since a bit rate of this DQPSK signal light becomes two times the bit rate of each data signal D1 or D2, it is enough, for transmission of the DQPSK signal light, for example, of 40 Gb/s, to process the data signals D1, D2 of 20 Gb/s with the pre-coder and drive each phase modulator 510, 513.

Moreover, as illustrated in an example of structure, for example, of FIG. 18, the RZ-DQPSK signal light is generated by giving the DQPSK signal light to an intensity modulator 540 which is driven with the clock signal CLK synchronized with the data signals D1, D2 in order to obtain the RZ pulse, while the CSRZ-DQPSK signal light in the duty ratio of about 67% can be generated by setting the frequency of the clock signal CLK to ½ of the data signals D1, D2 and the amplitude thereof to a half-wavelength voltage (Vπ) of the intensity modulator 540. Light intensity and phase of the RZ-DQPSK signal have the relationship illustrated, for example, in FIG. 19. In the figure, light intensity changes periodically as a result of the RZ modulation with CLK, whereas light intensity becomes constant when only the DQPSK modulation is carried out.

As an optical receiver of the background art for demodulating the DQPSK signal light, a receiver in the structure, for example, as illustrated in FIG. 20 is known (for example, refer to Japanese Published Application No. 2004-516743). In this optical receiver, the input DQPSK signal light is branched into two signal lights. Each branched light is respectively given to delay interferometers 501, 502. The delay interferometers 501, 502 are structured to generate a relative delay time difference corresponding to approximately one symbol of the DQPSK-modulated code between the signal lights propagated in each arm by giving difference in the lengths of optical paths of two arms of a Mach-Zehnder type optical waveguide formed, for example, on a silica substrate or indium phosphate substrate. Moreover, an interference operating point of the delay interferometer 501 is set to π/4 with the delay unit 503 formed on one arm, while the interference operating point of the delay interferometer 502 is set to −π/4 with the delay unit 503 formed on the other arm. Complementary two outputs outputted from an output coupler of the delay interferometer 501 are received with a differential receiving circuit 505 formed of a pair of optical detectors and an electric amplifier and thereby an electrical signal A corresponding to the signal D1 inputted to the transmitter is demodulated. Moreover, in the similar manner, complementary two outputs outputted from an output coupler of the delay interferometer 502 are also received with a differential receiving circuit 506 formed of a pair of optical detectors and an electric amplifier and thereby, an electrical signal B corresponding to the signal D2 inputted to the transmitter is generated through demodulation. The electric signals A/B are regenerated as stable electric signals by CDR (clock and data recovery) circuits and are thereafter subjected to the frame synchronization processes such as SDH/SONET/OTN or the like, regeneration of frame by a framer circuit and error correction by an FEC decoder circuit.

Moreover, the delay interferometers used for the optical receiver of the background art is also known in the structure combining, for example, fused optical fiber couplers in addition to the structure of optical waveguide type. See also the non-patent document by A. H. Gnauck et al., "Spectrally Efficient (0.8 b/s/Hz) 1–Tb/s (25×42.7 Gb/s) RZ-DQPSK Transmission Over 28 100-km SSMF Spans With 7 Optical Add/Drops", ECOC2004, PD.4.4.1

However, the optical receiver of the background art as illustrated in FIG. 20 has a problem that two delay interferometers including rather long optical paths for delaying the time of one symbol must be provided and thereby the optical receiver tend to be large in size. More specifically, for demodulation of the DQPSK signal light, for example, of 40 Gb/s, a delay time difference of about 50 ps corresponding to one symbol of the data signal of 20 Gb/s must be generated within each delay interferometer and it is therefore required to provide difference in the light path of about 15 mm between the arms. In the case where such delay interferometer is realized with an optical waveguide formed on the silica substrate or the like, a pair of optical waveguide circuits of large area must be allocated and therefore it is impossible to avoid enlargement of the optical receiver. Moreover, in the optical receiver of the background art, since the interference operating point (i.e. optical phase) of one delay interferometer must be set accurately to $\pi/4$, while the operating point of the other delay interferometer must be set, also accurately, to $-\pi/4$, here rises also a problem that a technology is required to control optical phase with high accuracy between the delay interferometers.

SUMMARY OF THE INVENTION

The present invention has been proposed by placing the focus to the point explained above. It is therefore an object of the present invention to provide a small size and low cost optical receiver, which can demodulate stably the signal light in accordance with the differential M-phase shift keying (DMPSK) system.

According to the optical receiver of the present invention, since the two delay interferometers to process the received DMPSK signal light in the background art is realized in turn with spatially paralleled, free-space delay interferometers, it is possible to provide a small size and low cost optical receiver.

Moreover, lower polarization dependency of the receiver operation may be realized.

Moreover, it is possible to provide an optical receiver having excellent temperature characteristic by realizing the setting of phase difference of $\pi/2$ between two light beams with one phase difference plate.

The optical receiving apparatus of the present invention comprises a light branching unit for branching a differential M-phase shift keying signal beam into four signal light beams, a delay adjusting unit for relatively giving a delay time difference of one symbol between a first signal light beam and a second signal light beam and between a third signal light beam and a fourth signal light beam among the branched four signal light beams and also giving a relative phase difference of almost odd number times of $\pi/2$ in the wavelength of the signal light between the first signal light beam and the third signal light beam, a demodulating unit for outputting at least two demodulated light signals through respective interferences between the first signal light beam and the second signal light beam, and between the third signal light beam and the fourth signal light beam on one plane which is not parallel to any signal light beam, and at least two light detectors for converting at least said two light signals into electrical signals.

Moreover, the delay adjusting unit is further provided with a phase difference providing plate to give a phase difference of almost odd number times of $\pi/2$ between the first signal light beam and the third signal light beam passing there through.

Moreover, temperature-varying means is further provided to maintain the phase difference of almost odd number times of $\pi/2$ by varying temperature of the phase difference providing plate in accordance with optical wavelength of the signal light variation.

Moreover, the demodulating unit is provided with a half-mirror on one plane where the interference of the first and second signal light beams and the interference of the third and fourth signal light beams are generated.

Moreover, the delay adjusting unit is provided with two independent reflecting surfaces and the branching unit and demodulating unit are respectively provided with half-mirrors and the half-mirror and the reflecting plane respectively have aperture areas enough for input of light under the condition that the four signal light beams are space-multiplexed.

Moreover, the light branching unit is further provided with an optical 2-branching unit for emitting two pairs of almost parallel beams to one optical divider through spatial multiplexing.

Moreover, the delay-adjusting unit is further provided with a phase adjuster, which is provided with at least two wedge plates for varying length of light path through temperature control.

Moreover, the branching unit and demodulating unit are respectively provided with half-mirrors the reflecting films of the half-mirrors are respectively provided exclusively at the front surface and rear surface.

Moreover, an optical receiving apparatus comprises a light branching unit for branching the differential M-phase shift keying signal light into four signal light beams, a delay adjusting unit for guiding a first signal light beam and a third signal light beam among the branched four signal light beams to a movable folded reflector, relatively generating a delay time difference of almost one symbol between a second signal light beam and a fourth signal light beam, and giving a phase difference of almost odd number times of $\pi/2$ in the signal light wavelength to any of between the second signal light beam and fourth signal light beam or between the first signal light beam and the third signal light beam, a demodulating unit for outputting at least four demodulated light signals through respective interferences between the first signal light beam and the second signal light beam and between the third signal light beam and the fourth signal light beam among the four signal light beams on one plane which is not parallel to any of signal light beams, a first optical system for making close at least two of the four light signals, and at least two light detecting elements for converting at least said at least two light signals into electrical signals.

Moreover, the first optical system is provided with two convex lenses allocated in cascade.

Moreover, the first optical system is provided with two reflecting surfaces allocated in cascade.

Moreover, the half-mirror and reflection mirror are formed in the shape of wedge type.

Moreover, the light branching unit and demodulating unit are provided in common with a half-mirror, while the light branching unit and the branching unit and demodulating unit are provided with one half-mirror.

Moreover, distance between at least two light signals outputted from the demodulating unit can be made shorter than the distance between light detecting.

Moreover, two light signal beams outputted from the demodulating unit swap their axes with each other in the second optical system and reach the two light detecting elements.

The optical receiving apparatus of the present invention comprises a light branching unit for branching the differential M-phase shift keying signal light into four signal light beams, a delay adjusting unit for giving relatively a delay time difference of almost one symbol to two signal light beams among branched four signal light beams and also giving relative phase difference of almost $\pi/2$ to the signal light wavelength among the remaining two signal light beams, a demodulating unit for outputting at least two demodulated light signals through interferences between remaining two signal light beams corresponding to the two signal light beams, at least two light detecting elements for converting at least two light signals into electric signals, and means for equalizing the length of each optical path up to the light detecting element.

Moreover, there are provided a light branching unit for branching the differential M-phase shift keying signal light into four signal light beams, a delay adjusting unit for relatively generating a delay time of almost one symbol between a first signal light beam and a second signal light beam among the branched four signal light beams, generating a delay time difference of almost one symbol between a third signal light beam and a fourth signal light beam, and giving a relative phase difference of almost odd number times of $\pi/2$ in the signal light wavelength between the first signal light beam and the third signal light beam, a demodulating unit for outputting at least two demodulated light signals through interferences between the first signal light beam and the second signal light beam and between the third signal light beam and the fourth signal light beam among the four signal light beams on one plane not parallel to any of signal light beams, and at least two light detectors for converting at least two light signals into electrical signals, wherein, any light paths of a plurality of light paths up to the detecting element from the branched signal light does not reflect the signal light.

Moreover, the delay-adjusting unit is provided with a phase control unit and the phase controller controls phase difference by moving a reflecting plane almost in the right angle for the light path.

Moreover, the delay-adjusting unit is provided with a phase control unit and the reflecting plane can be moved with temperature varying means.

With the structure explained above, the apparatus can be formed in small size by spatially processing the light beams.

BRIEF DESCRIPTION OF THE DRAWINGS

The best mode for carrying out the present invention will be explained with reference to the accompanying drawings. The like or corresponding elements are designated with the like reference numerals throughout the drawings.

FIG. 16 is a diagram illustrating the characteristics of each modulation system for light signals.

DETAILED DESCRIPTION

Figure 1:
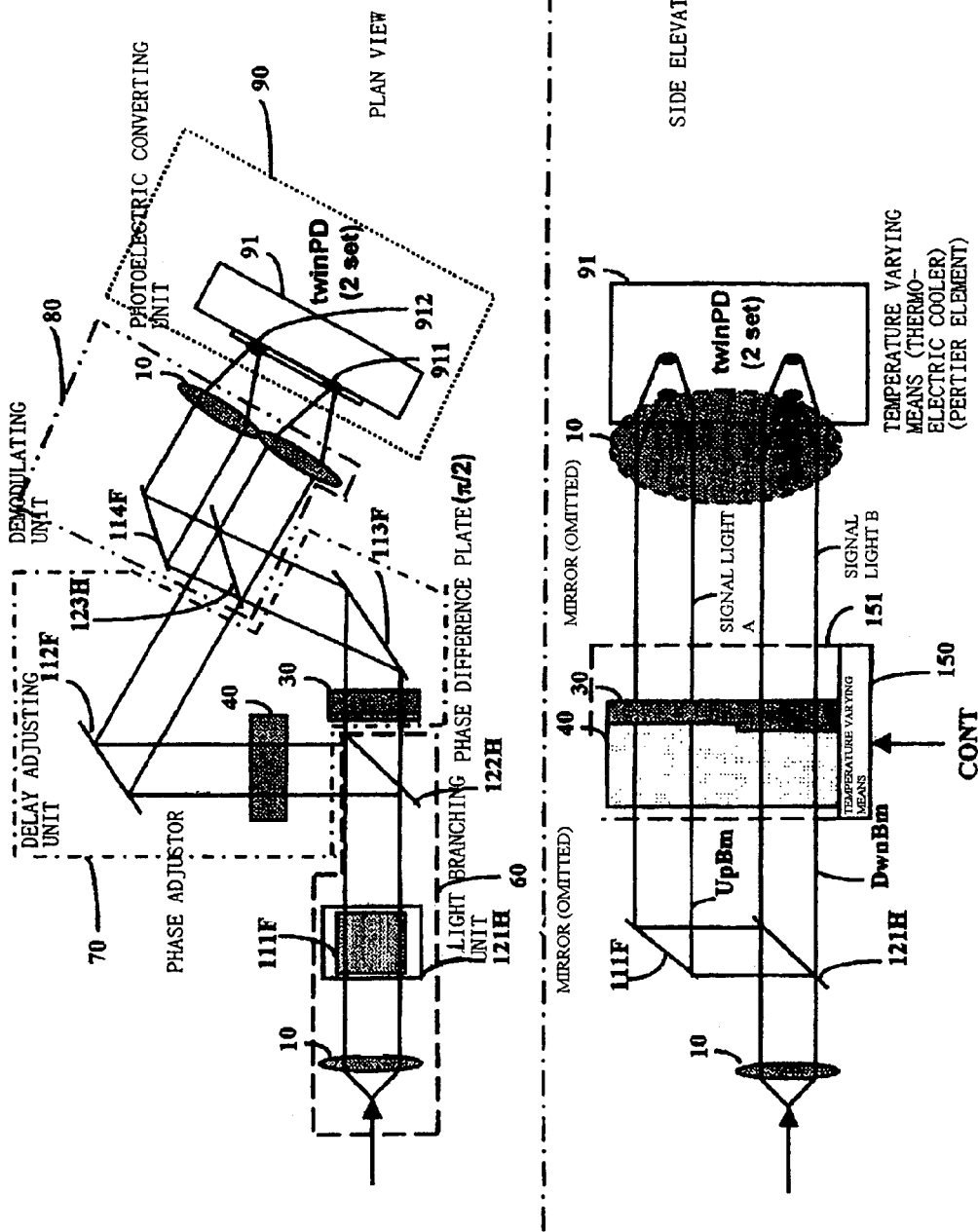
FIG. 1 is a block diagram illustrating a basic structure of an optical receiving apparatus as a first embodiment of the present invention.

FIG. 1 is a block diagram illustrating a structure of an optical receiver as a first embodiment of the present invention.

The optical receiver is composed of principal units of a light branching unit 60, a delay-adjusting unit 70, a demodulating unit 80, and a photo-electric converting unit (light detecting unit) 90. Moreover, arrangement of the principal part of the optical receiver is illustrated in the plan view of FIG. 1, and a couple of principal portions of optical receiver (receiving part of the in-phase element and receiving part of the quadrature element) are arranged (multiplexed) in the two spaces as shown in the side elevation of FIG. 1. It is also possible to replace the plan view and side elevation as desired in FIG. 1.

The basic structure of the optical receiver will be explained below.

The light branching unit 60 splits the power of the input light modulated with the DQPSK system, which M is a DMPSK system with M being 4, to at least four almost parallel light beams (in this specification, one light beam is called a "signal light" or "signal light beam").

In this embodiment, a first light beam and a second light beam among four branched light beams are formed as a pair of light beams indicated by DwnBm (side elevation in FIG. 1) and a third light beam and a fourth light beam are formed as a pair of light beams indicated by UpBm. However, DwnBm may be indicated as the third and fourth light beams, while UpBm may also be indicated as the first light beam and second light beam.

Namely, the light branching unit 60 is constituted with a collimator lens 10 for converting the input light to almost collimated light beam, a half-mirror 121H for branching the power of the converted light beam into two light beams, a mirror 111F to reflect a part of the light beam reflected and branched by the half-mirror 121H to almost become parallel to a part of the light beam having passed the half-mirror 121H, and a half-mirror 122H for further branching each light beam branched by the half-mirror 121H into two light beams.

Since the half-mirrors 121H, 122H, 123H, phase adjustor 40, mirrors 112F, 113F, 114F and phase difference plate 30 are respectively formed by flat planes, these can be applied for parallel light beams UpBm and DwnBm simultaneously. Since these elements are formed by flat planes respectively, a relative delay time difference of almost one symbol in the light beams UpBm and DwnBm and a phase difference in the DQPSK signal light can be set and adjusted accurately. With the structure explained above, the light branching unit 60 can supply a pair of almost parallel light beams to each multiplexed space by branching the input light in the power thereof. Moreover, in an other embodiment, it is also possible that a pair of light beams having almost identical power can be supplied to three or more spatial slots by branching the input light to two light beams, for example, with the half-mirror 121H and then additionally providing the half-mirror in the tree structure to further branch each branched light beam into two light beams.

The light branching unit 60 utilizes three half-mirrors of 2-branching half-mirrors (one) and interference half-mirror (two). These half-mirrors should be suitably designed so that the phases of the P polarization and the S polarization of the reflected light and the passing light are matched. Namely, the optical systems in the present invention such as half-mirror, mirror, phase difference plate, phase adjustor suitably has less dependence on the polarization. The method of manufacturing such half-mirror is well known and the related techniques are also disclosed in the JP-A No. 1996-254611.

In the light branching unit 60 and delay adjusting unit 70, a couple of half-mirrors 122H, 123H are used and these half-mirrors and mirror are suitably designed so that the ratios of the P polarization and S polarization of the reflected light and passing light are matched. Namely, it is suitable to use the half-mirror having less dependence on polarization. The light inputted to the optical receiver is likely to deteriorate quality of the demodulated intensity modulated signal if a phase difference exists between the P polarization and S polarization of the signal light branched when the branched two signal lights are interfered with each other. However, for the polarization phase difference in the optical transmission path between the transmitter and receiver in which the DQPSK modulated signal is propagated, namely for the PMD (Polarization Mode Dispersion), signal quality after demodulation is rather good in comparison with that of the other modulation system (reference: FIG. 16).

Figure 20:
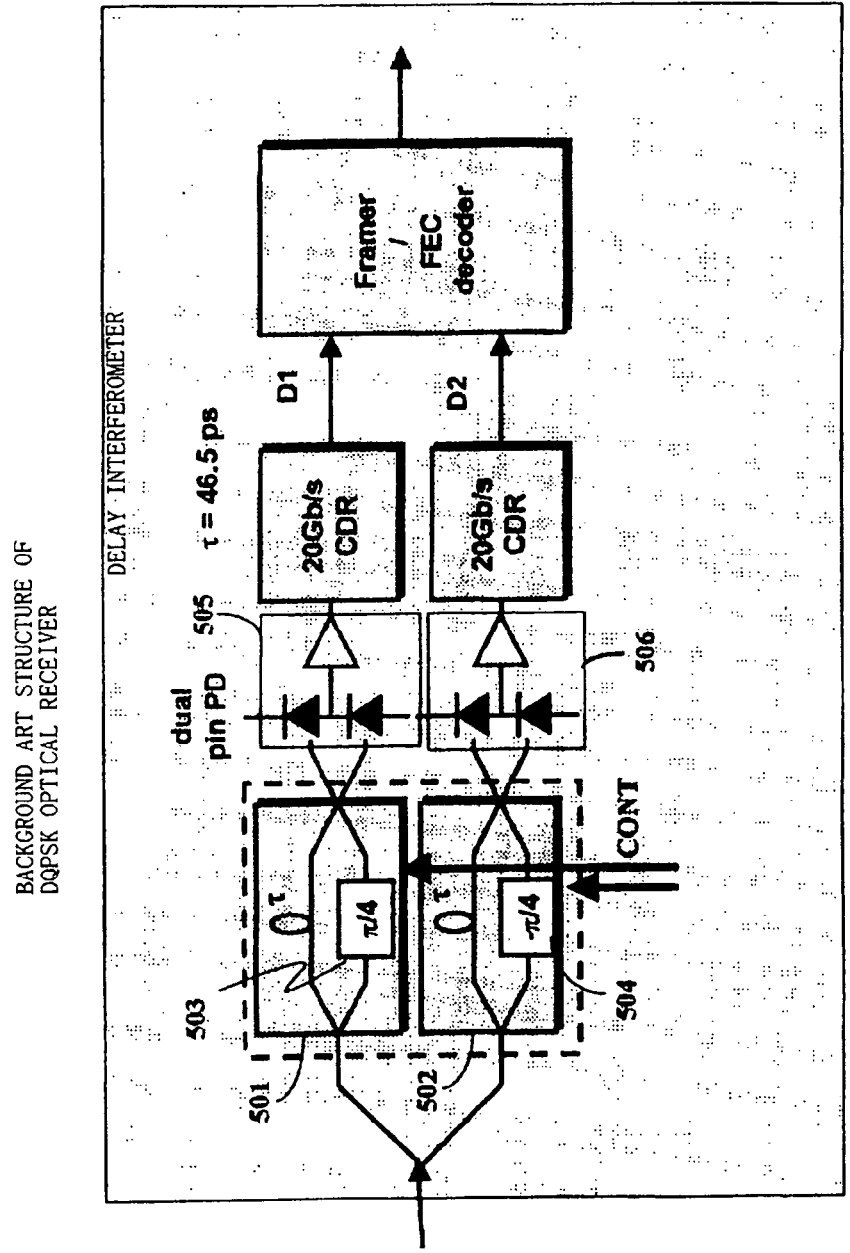
FIG. 20 is a diagram illustrating a structure example of the background art of the DQPSK optical transmitting apparatus.

The delay adjusting unit 70 is capable of setting the relative delay time difference between the first and second (third and fourth) light beams branched with the half-mirror 122H to the delay time difference of almost one symbol of the DQPSK modulated signal and is also capable of accurately adjusting the wavelength phase difference between light beams to sufficient accuracy, for example, almost within one degree for $+\pi/4 \pm 2n\pi(-\pi/4+2n\pi)$ (n: integer). The delay time difference ($\tau$) of almost one symbol and wavelength phase difference of almost $\pi/2$ between a pair of light beams may be understood more easily in comparison with that in FIG. 20.

The first and second (third and fourth) light beams adjusted in the delay time difference and phase difference are respectively inputted to both surfaces of the half-mirror 123H of the demodulating unit 80. Therefore, the half-mirror 123H is required to have the aperture area enough for input of the four signal light beams, which are spatially multiplexed.

In more detail, the delay adjusting unit 70 is provided with a phase adjustor 40 which is common for the odd number light beam or even number light beam among the first to fourth light beams, or two phase adjustors 40 can be equipped each of which is common for either odd number and even number light beams. As the phase adjustor 40, for example, a silicon dioxide ($SiO_2$) plate may be used. Since the silicon dioxide plate changes in the refractive index depending on temperature, a phase difference between the first and second (third and fourth) light beams can be adjusted precisely to be matched with almost sufficiently small error with $\pi/4+2n\pi(-\pi/4+2n\pi)$ by adjusting the temperature of the phase adjustor 40 using, for example, a thermo-electric cooler (TEC) based on the Peltier effect as a temperature varying means. Moreover, when two phase adjustors 40 are respectively allocated to pass the first and second light beams, and third and fourth light beams, the range of the phase adjustment can be widened by controlling one phase adjustor 40 to rise in temperature and the other phase adjustor 40 to fall in temperature. Namely, one of the two phase adjustor 40 serves mainly for adjusting the phase difference of a pair of light beams branched from the light beam UpBm to almost $\pi/4$ and adjusting the phase difference of a pair of light beams branched from the light beam DwnBm to almost $-\pi/4$, whereas the other phase adjustor 40 mainly provides a function to adjust, to a certain degree, the delay time difference of almost one symbol.

Moreover, response characteristic of temperature control can be improved by adhering a metal film such as copper and silver having good thermal conductivity to the area near the optical beam of the phase adjustor 40, where the width and thickness of the metal film should be as thick and wide as possible. Moreover, each phase adjustor 40 may also be thermally isolated from the other devices in order to eliminate influence of temperature change by the TEC 150 on the other device. This can be for example achieved by covering the phase adjustor 40 by a transparent case 151. Such isolation will give much contribution to improvement in the temperature distribution characteristic of the optical receiver as a whole and also will provide stable receiving operation.

The first and second (third and fourth) light beams adjusted in the delay time difference and phase difference are reflected by the mirror 112F and mirror 113F. Relative delay time difference of almost one symbol in the DQPSK modulated signal can be set by respectively setting the allocating positions of these two mirrors and the incident angle of light beam to the half-mirror 121H. Here, the phase adjustor 40 and phase difference plate 30 may be installed at the desired location between two optical paths between the 2-branching half-mirror and the interference half-mirror.

Two signal lights (thereafter, conveniently referred to as the signal light A and signal light B, as required) outputted in the phase difference of almost $\pi/2$ by providing a phase difference plate 30 for setting the phase difference between the light beams UpBm and light beam DwnBm to almost $\pi/2$ (90 degrees). These two signal lights are demodulated with the demodulating unit 80 and the information conveyed after conversion into the electrical signal in the photoelectric converting unit (light detecting unit) 90 can be swapped, based on the setting of the phase adjustor 40. Accordingly, when the signals conveyed after demodulation by the signal light A and the signal light B are swapped, these should be swapped back, as required, after two signal lights are converted into the electrical signals.

The phase difference plate 30 is formed thinner only at the upper half but it may also be formed thinner only at the lower half. Moreover, it is important for the phase difference plate 30 that an optical path length is different in the upper half and lower half, and mechanical thickness may be identical in the upper half and the lower half. Such formation can be realized, for example, by providing the structure in which the refractive index is different in the upper half and lower half of the same plane. Moreover, the phase difference plate 30 may also be constituted to use in the upside down condition. Moreover, a phase difference may be adjusted by rotating the phase difference plate 30 around the center of the upper and lower sides. In addition, it is also possible to adjust a phase difference between two light beams in accordance with an inclination angle of the phase difference plate 30. Moreover, a phase difference between two light beams can also be adjusted by combining rotation and inclination of the phase difference plate 30.

When the receiving wavelength is varied, this phase difference plate 30 can realize adjustment to maintain relative phase difference of almost $\pi/2$ between two light beams with a temperature variable means utilizing the TEC (thermoelectric cooler) or the like. In this case, it is also possible to improve the response characteristic of temperature control by adhering a metal film such as copper or aluminum that has good thermal conductivity with as much thickness and width as possible to the area near the light beam of the phase difference plate 30. Moreover, thermal separation of phase difference plate 30 from the other devices by covering for example with a transparent case 151 may be introduced to avoid influence of temperature change by TEC on the other device. Such separation should improve temperature distribution characteristic of the optical receiver as a whole.

Meanwhile, when the phase difference plate 30 is realized by combining, in the adequate thicknesses, at least two kinds of optical materials to cancel each other the dependence on wavelength of the refractive index within the available range of wavelength, relative phase difference of almost $\pi/2$ between the two light beams can be almost maintained even if the receiving wavelength is varied.

The demodulating unit 80 can realize demodulation of the phase of the DQPSK light signal to the intensity of the signal light A (signal light B) through interference, in the half-mirror 123H, of the first and second (third and fourth) light beams subjected to the delay time difference and phase difference of almost one symbol of the DQPSK modulated signal with the delay adjusting unit 70. The photodiodes 911 and 912 respectively receive the light signal A (light signal B) demodulated with the demodulating unit 80 and then convert the signal A (signal B) into the electrical signal.

The photoelectric converting unit (light detecting unit) 90 can be configured to receive the complementary two signals for signal lights A (or for signal lights B) using a couple of photodiodes to improve receiving sensitivity and noise characteristic. Moreover, it is also possible to receive only one signal lights of signal light A (or signal light B) of complementary signals and then convert this signal into the electrical signal with only one photodiode (PD). In this case, for example, the mirror 114F is unnecessary and the receiving sensitivity is deteriorated in a certain degree, but low-cost manufacture can be realized.

One of the complementary two light signals demodulated through interference via the half-mirror 123H can be received via the mirror 114F. In this case, delay time (i.e. electrical phase) difference as much as the distance between the half-mirror 123H and mirror 114F can be generated but this phase difference can be compensated, if necessary, in the signal process after conversion of the light signal into the electrical signal. Otherwise, it is possible to insert a glass plate for adjusting the length of optical path between the half-mirror 123H and the collimator lens 10 or to change the arrangement of each PD on the photoelectric converting unit (light detecting unit) 90 to make identical the distance among the half-mirror 123H, PD912 and PD911. Such change of arrangement can be realized, for example, by introducing a recessed area on the surface of a substrate 91 to allocate the PD 911.

With the structure explained above, after the input light modulated with the DQPSK system is converted into a plurality of light beams, two pairs of light beams are branched to each space obtained by space multiplexing, and a delay time difference of almost one symbol in the DQPSK modulation can be given between two light beams within each pair of signal lights. Moreover, two intensity modulated light signals can be obtained from each pair of light beams through interference between the two light beams within each pair of the signal lights. Here accurate relative phase difference of almost $\pi/2$ was imposed between the two interferences, so that the desired pair of electrical signals (signal A and B) can be obtained.

Figure 2:
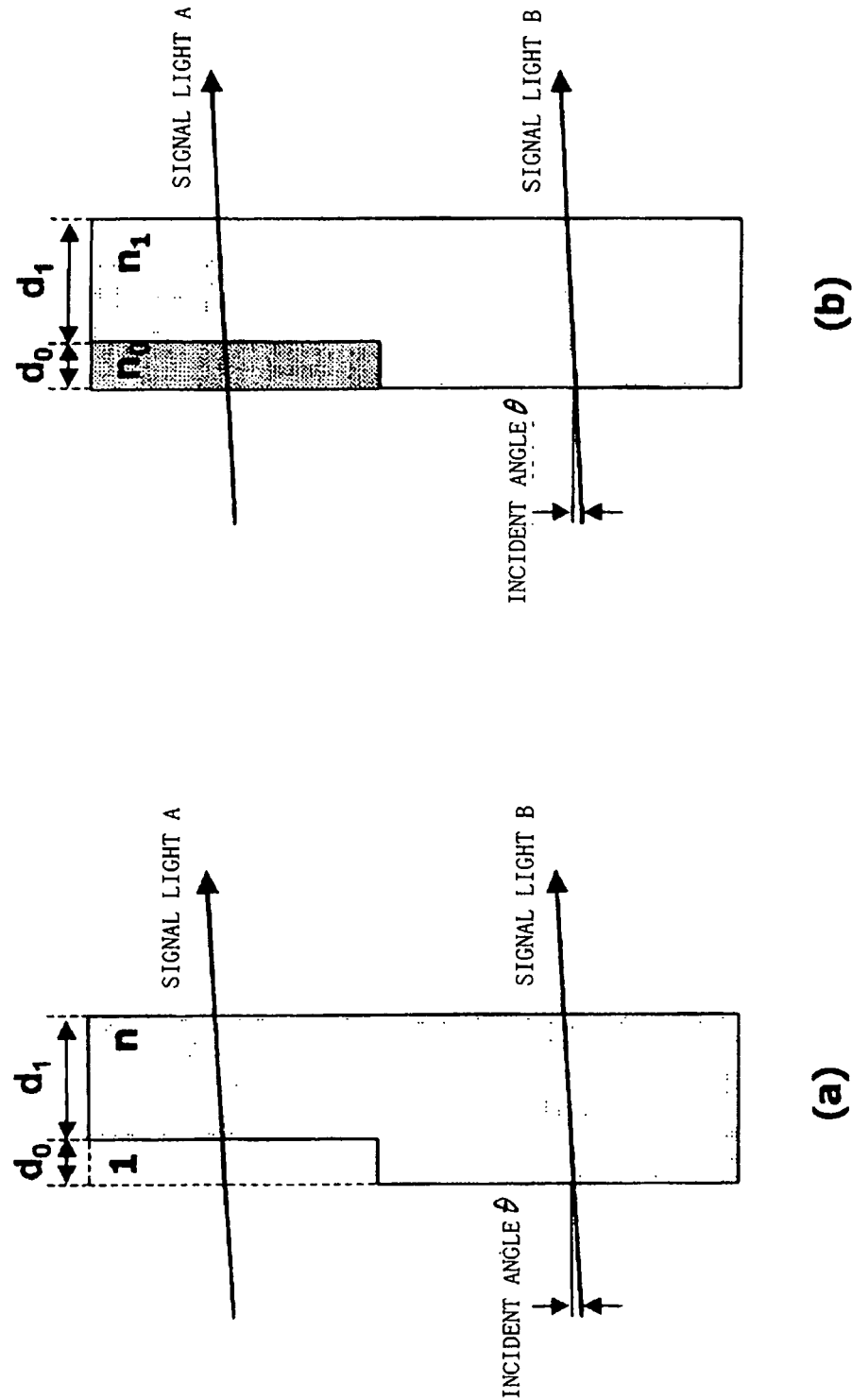
FIG. 2 is a diagram explaining the operation principle of a phase difference plate.

FIG. 2 is a diagram illustrating a method of designing the phase difference plate 30 to set relative phase difference, for example, between the first light beam (light beam A) and the third light beam (light beam B) to almost $\pi/2$ in the light beam DwnBm (first and second light beams) and the light beam UpBnm (third and fourth light beams). FIG. 2(*a*) illustrates an example of the phase plate, which is formed by recessing a part of a glass plate for the depth d0, or thickening the other part of the glass plate by d0 by evaporation.

The phase difference plate 30 is formed, for example, of glass material. For example, the silicon dioxide ($SiO_2$) showing comparatively large change in the refractive index in accordance with temperature may be used. The relative phase difference can be precisely adjusted and maintained almost to $\pi/2$ by adjusting and maintaining temperature through use of this silicon dioxide. Moreover, as the phase difference plate 30, a material that shows higher permeability of light beam in the signal light wavelength and larger temperature coefficient may be used suitably.

The phase difference of both light beams can be set to almost $\pi/2$ by providing the optical path of different length when the light beams A and B pass the phase difference plate 30. For example, such phase difference can be realized by shaving the glass portion of the upper or lower half (or evaporating the additional layer of silicon dioxide). Moreover, it is also possible that such phase difference can be adjusted by setting different temperatures to the areas where the light beams A and the light beam B pass respectively.

A design example where the upper half of the surface of glass is recessed or the silicon dioxide is evaporated to the lower half will be explained below.

First, the length of optical paths of the light beams A and B of the phase difference plate 30 are obtained as explained below.

Light beam $A\ LA = \{d_0 + nd_1\}\sec\theta$

Light beam $B\ LB = \{n(d_0 + d_1)\}\sec\theta$

Next, the phases of the light beams A and B of the phase difference plate 30 are obtained as follows.

$$\phi A = (2\pi sec\theta/\lambda)(d_0 + n_0 d_1 + n_1 d_1 \Delta T) \qquad \text{Light beam A}$$

$$\phi B = (2\pi sec\theta/\lambda)(d_0 + d1)(n_1 + n'_1 \Delta T) \qquad \text{Light beam B}$$

Here, $n_1$ is the refractive index under the normal temperature, $n'_1$ is the temperature coefficient of refractive index, T is the temperature, $n = n_1 + n'_1 \Delta T$ is the refractive index at a certain temperature, $\theta$ is the incident angle, and the refractive index of the air is assumed to be 1 (one).

Subsequently, a phase difference between the light beams A and B is obtained.

$$\Delta\phi = (2\pi(n_1-1)d_0/\lambda)sec\theta + (2\pi(n'_1 d_0/\lambda)sec\theta\Delta T)$$

When this formula satisfies the condition $(n_1-1)d_0 sec\theta = (\frac{1}{4}+N)\lambda_0$ (N is an integer) for the center wavelength $\lambda_0$ used, $\Delta\phi = \pi/2$ can be obtained under the normal temperature ($\Delta T = 0$) for the wavelength $\lambda_0$.

Accordingly, if the receiving wavelength of the DQPSK signal is deviated as much as $\Delta\lambda$, $\Delta\phi$ can be kept constant by shifting the temperature of the phase difference plate 30 as much as $\Delta T$ in order to satisfy the following formula.

$$\Delta T = ((\tfrac{1}{4}+N)/(n'_1 d_0 sec\theta))\Delta\lambda$$

Moreover, when the receiving wavelength of the DQPSK signal is deviated as much as $\Delta\lambda$, $\Delta\phi$ can be kept constant by shifting the length of stepped portion ($d_0$) of the phase difference plate 30 as much as $\Delta d$.

$$\Delta d = ((\tfrac{1}{4}+N)/((n_0-1)sec\theta))\Delta\lambda$$

Namely, $\Delta\lambda$ can be increased only by $\Delta d$ by rotating or inclining the phase difference plate 30 through motor control. Accordingly, allowance in adjustment can be attained by previously giving allowance at the time of initial introduction to realize $\pm\Delta d$.

As the other example, a material having the refractive index of n0 is used in the thickness d0 at the surface of the upper side of glass is illustrated in FIG. 2(*b*). In this design, the material having the refractive index n0 is processed in the thickness $d_0$ at the upper half of the glass.

First, the lengths of the optical paths of the light beams A and B of the phase difference plate 30 are obtained as follows.

$$LA = \{n_0 d_0 + n_1 d_1\} sec\theta \qquad \text{Light beam A}$$

$$LB = \{n_1(d_0 + d_1)\} sec\theta \qquad \text{Light beam B}$$

Next, phases under the normal temperature of the light beams A and B of the phase difference plate 30 are obtained as explained below.

$$\phi A = (2\pi sec\theta/\lambda)(n_0 d_0 + n_1 d_1) \qquad \text{Light beam A}$$

$$\phi B = (2\pi sec\theta/\lambda)(d_0 + d_1)(n_1) \qquad \text{Light beam B}$$

Subsequently, a phase difference between the light beams A and B is obtained.

$$\phi = (2\pi(n_1-n_0)d_0/\lambda)sec\theta$$

When this formula satisfies the condition $(n_0-1)d_0 sec\theta = (\frac{1}{4}+N)\lambda_0$ (N is an integer) for the center wavelength $\lambda_0$ used, $\Delta\phi = (\pi/2)$ can be obtained under the normal temperature ($\Delta T = 0$) for the wavelength $\lambda 0$. Moreover, when the receiving wavelength of the DQPSK signal is shifted as much as $\Delta\lambda$, $\Delta\phi$ can be kept constant by shifting the temperature of the phase difference plate 30 as much as $\Delta T$ like the design example explained above.

Figure 3:
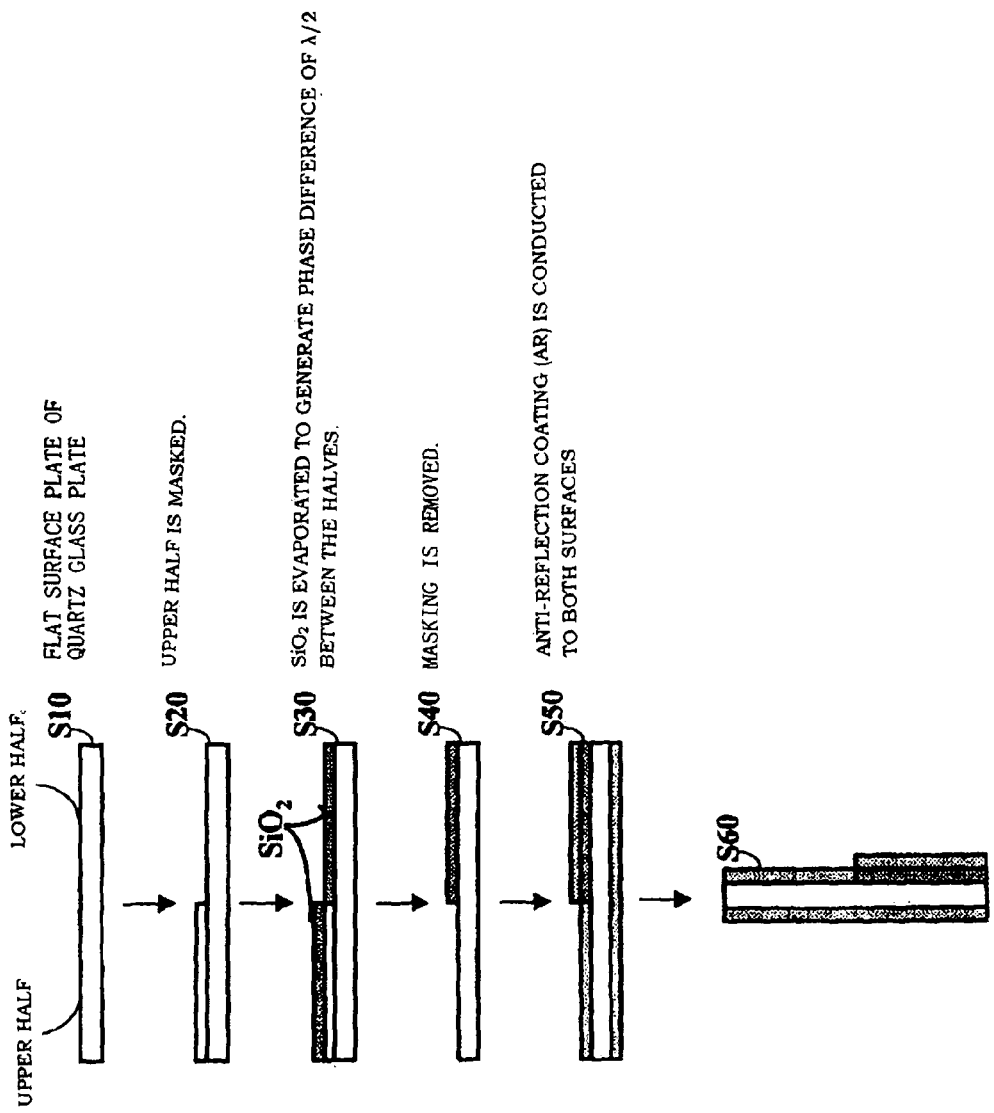
FIG. 3 is a diagram explaining a method of manufacturing the phase difference plate.

FIG. 3 illustrates an example of the method for manufacturing the phase difference plate of the present invention.

As the glass material, the silicon dioxide that becomes transparent in the infrared region can be used suitably. First, in the more economical method using shorter manufacturing period, the upper part of the surface of the glass plate is cut away as much as almost $\pi/2$. However, in order to accurately generate the phase difference of almost $\pi/2$ when the light beams A and B pass, it is more suitable that the silicon dioxide is evaporated on the parallel flat plate 30. The method of evaporating the silicon dioxide will be explained below.

First, in the step S10, the parallel flat plate 30 ensuring excellent parallelism is formed of a glass material.

In the step S20, masking is conducted to the upper half of the single side of the parallel flat plate 30. In some cases, the masking is also required for the opposite side surface.

In the step S30, the silicon dioxide ($SiO_2$) is vacuum-evaporated accurately in the thickness to provide a phase difference of almost $\pi/2$ in the signal beam wavelength only in the single side of the parallel flat plate 30.

In the step S40, unmasking work is conducted. As the unmasking method, the masking can be dissolved using a solvent or the masking can also be unmasked with the etching process. However, in the more economical method, the masking is removed mechanically. However, in the mechanical unmasking method, it should be noted that the parallel flat plate 30 is protected from damage.

Finally, as the step S50, the both surfaces are subjected to the anti-reflection coating. In above explanation, attention is paid to the phase difference of $\pi/2$ but operations in the present invention can also be realized even when the phase difference is set to $3\pi/2$ or $5\pi/3$ or the like which is the odd number times of almost $\pi/2$.

With the method explained above, the phase difference plate 30 can be manufactured.

Figure 4:
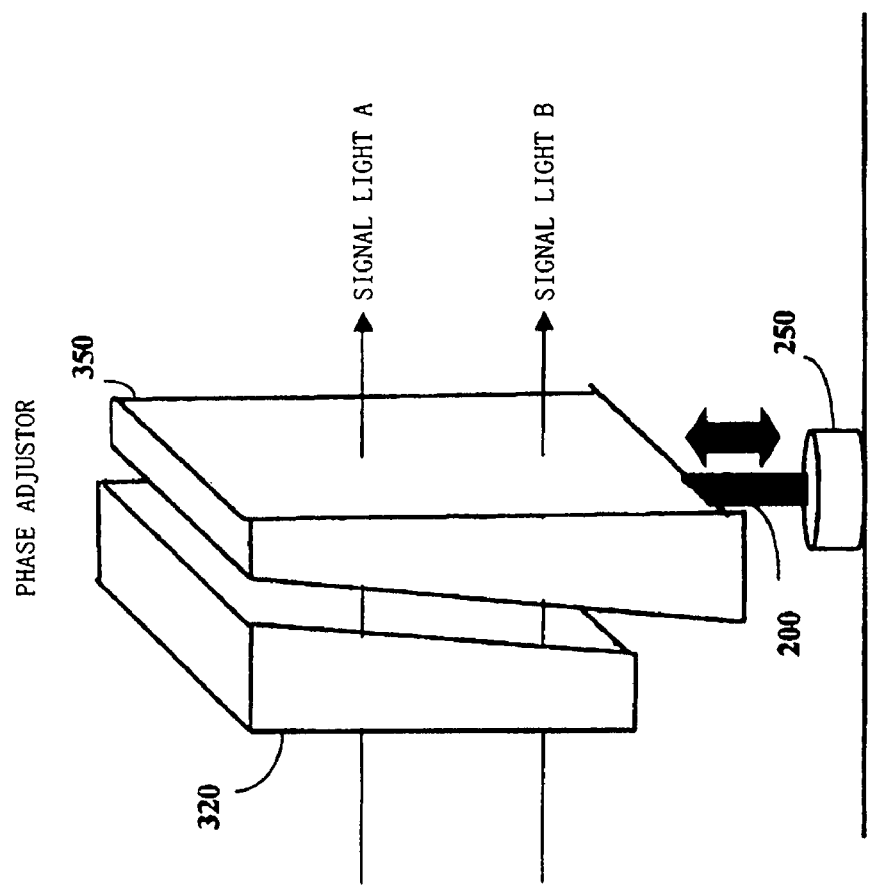
FIG. 4 is a diagram explaining a phase adjustor (No. 1).

FIG. 4 is a diagram illustrating an example of an embodiment of the phase adjustor 4.

For example, the light beam DwnBm is branched to the first light beam and the second light beam and the relative delay time difference between both light beams is set to a value corresponding to almost one symbol of the DQPSK signal. Thereafter, as an example, the phase adjustor 40 precisely adjusts a phase difference between the light beam DwnBm and the light beam UpBm to the almost odd number times of $\pi/2$. In this FIG. 4, the top (summit) areas of a couple of wedge prisms 320 and 350 are combined in the opposite directions with each other as illustrated. The wedge prism 310 is fixed to a housing or the like using adhesive, while the wedge prism 350 may be moved with a micrometer screw. For example, numeral 200 denotes a micrometer and 250, a micrometer screw. In this structure, difference in the length of light path in the atmospheric condition of the light beams A and B can be varied by adjusting the micrometer screw in view of changing the height of the wedge prism 350. Namely, the length of light path can be adjusted simultaneously for the first and second light beams.

Moreover, for example, as the micrometer 200, an aluminum rod having the large thermal expansion coefficient may be used and the height of wedge prism 350 can be controlled electrically by using TEC or heater as the micrometer screw 250. Namely, relative phase difference of almost one symbol can be maintained by changing temperature of the aluminum rod by controlling the TEC with the information on the basis of the output signal from the photoelectric converting unit (light detecting unity) 90. For example, a bit error rate is one of the information based on the output signal.

Figure 5:
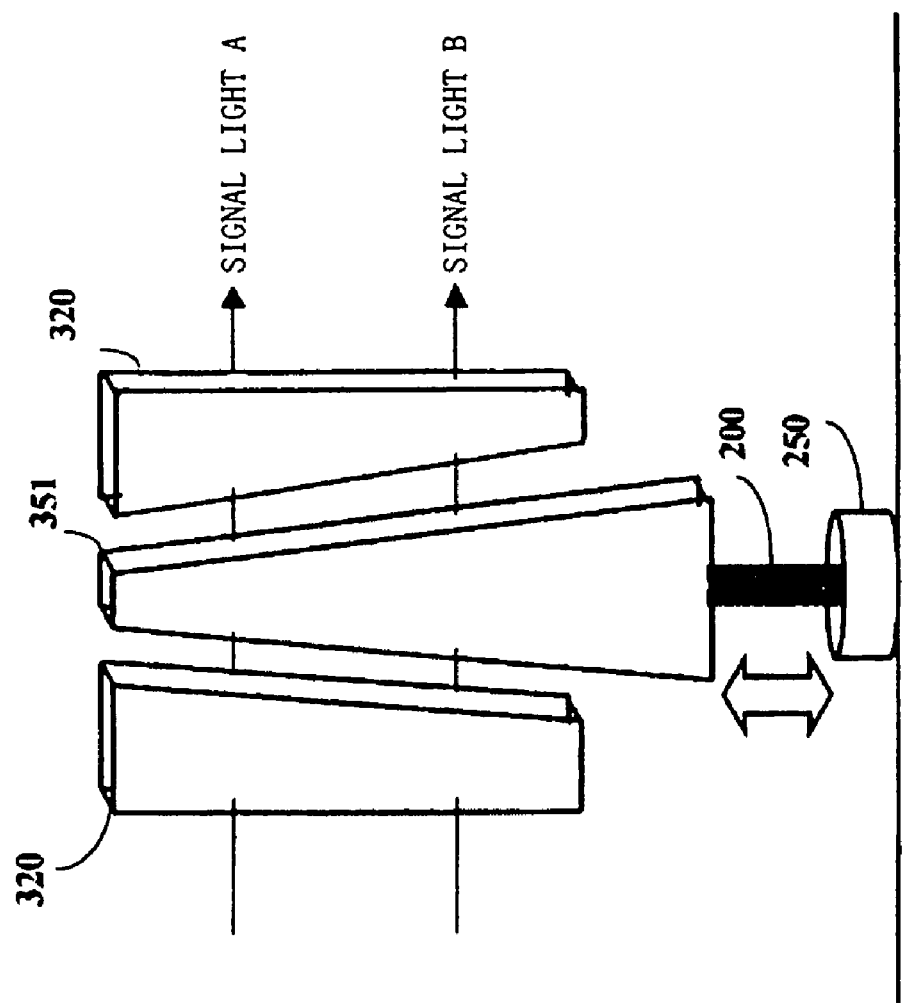
FIG. 5 is a diagram explaining the phase adjuster (No. 2).

In addition, it is also possible to combine the control of length of light path of the light beams A and B with temperature control using the TEC and adjustment of length of light path of the light beams A and B with adjustment of the micrometer screw. FIG. 5 is a diagram illustrating a modification example of the embodiment of the phase adjustor 40.

In this embodiment, the wedge prism 351 is substantially similar to the prism formed of two plates of the wedge prisms 350. Namely, the wedge prism 351 has the top angle equal to about two times the top angle of the wedge prism 350. The wedge prism 351 uses two plates of the wedge prisms 320. Accordingly, it is possible to generate change in the length of light path, which is equal to two times the moving distance by thermal expansion of the aluminum rod 200 in FIG. 4.

Next, as an example in which the present invention can be adapted to the DMPSK system, an embodiment for receiving the D8PSK-modulated signal light will be explained below.

First, disclosed structure in the optical receiver is not modified. After conversion of the intensity-modulated light signals into electrical signals by the photoelectric converting unit 92, correspondence between the phase change from previous symbol of the DQPSK modulated signal and electrical output of the signal A (signal B) received with the differential PD1 (PD2) will be indicated below.

PD1 current: positive (0 degree),
PD2 current: positive (0 degree)
PD1 current: negative (90 degree),
PD2 current: positive (90 degree)
PD1 current: negative (180 degree),
PD2 current: negative (180 degree)
PD1 current: positive (270 degree),
PD2 current: negative (270 degree)

As indicated above, a change of the phase between the two consecutive DQPSK modulated symbols can be obtained by combining the currents (voltages) of the PD1 and PD2. For example, when PD1 is positive and PD2 is positive, the phase chage is 0, while when PD1 is positive and PD2 is negative, the phase change is 270 degrees. Conversion to 2 bits of the digital value is possible based on this phase change.

Subsequently, an example of D8PSK will be explained. In the D8PSK, the phase change must be identified in every 45 degrees. Relationship between the shifting angle and the current is as follows.

PD1 current: positive (0 degree),
PD2 current: Positive (0 degree)
PD1 current: 0(zero) (45 degree),
PD2 current: Positive (45 degree)
PD1 current: negative (90 degree),
PD2 current: Positive (90 degree)
PD1 current: negative (135 degree),
PD2 current: 0(zero) (135 degree)
PD1 current: negative (180 degree),
PD2 current: negative (180 degree)
PD1 current: 0(zero) (225 degree),
PD2 current: negative (225 degree)
PD1 current: positive (270 degree),
PD2 current: negative (270 degree)
PD1 current: positive (315 degree),
PD2 current: 0(zero) (315 degree)

The D8PSK signal can be demodulated by identifying the values of three values (positive, 0(zero), negative) for the PD1 and PD2 currents detected as explained above. Moreover, for the D16PSK or more, the DMPSK modulated signal (M=2n) can be received by providing a multi-level discriminator for the receiving current.

Figure 6:
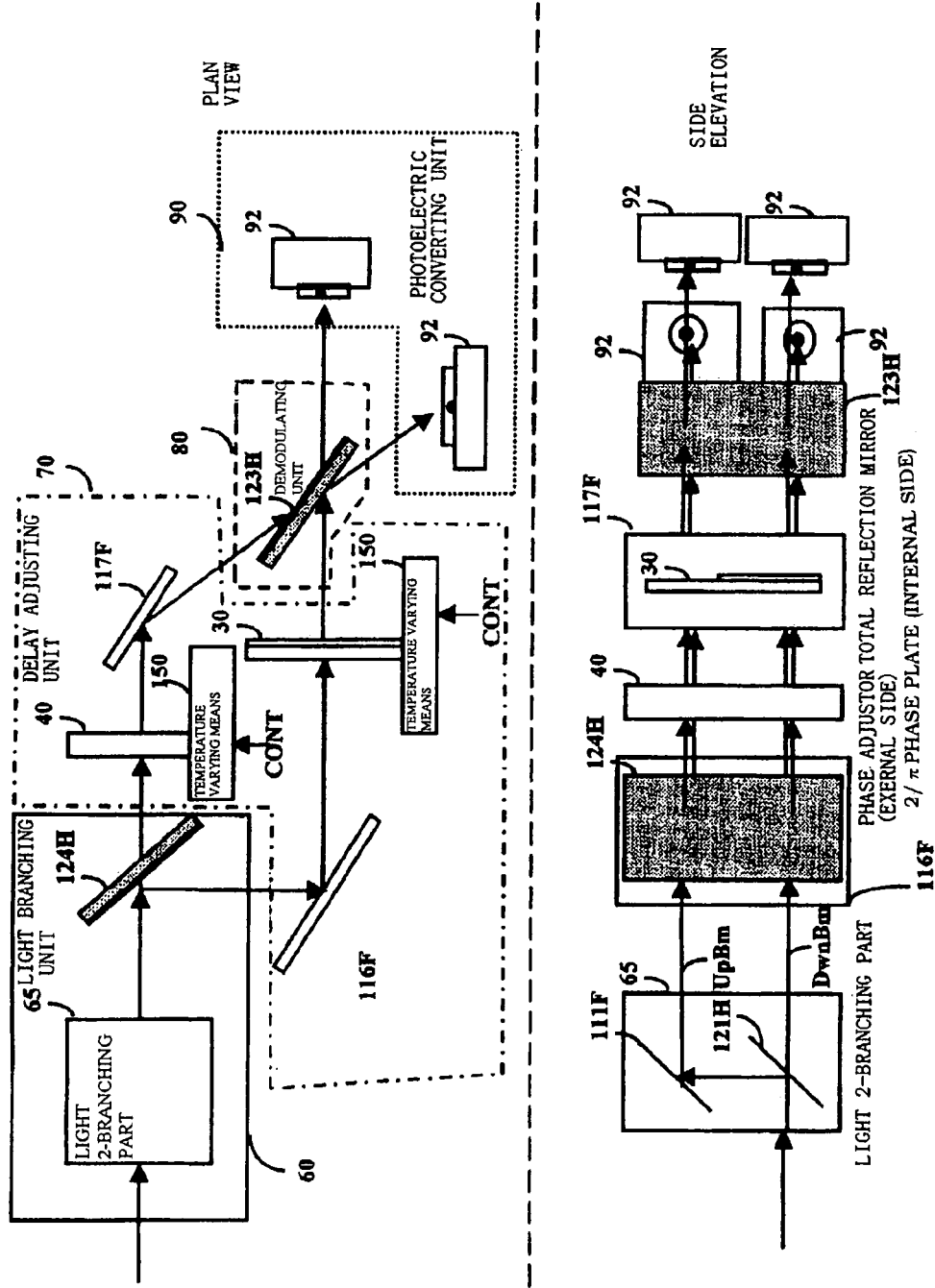
FIG. 6 is a diagram illustrating a modification example (additional number 1) of the optical receiving apparatus as the first embodiment of the present invention.

FIG. 6 is a block diagram illustrating a structure of a modification example of the optical receiver as the first embodiment of the present invention. Explanation will be made by focusing on difference from the first embodiment explained above.

The light 2-branching part 65 for branching the DQPSK modulated signal light into two light beams is formed (side elevation) of the half-mirror 121H and the mirror 111F and a pair of almost parallel light beams are respectively outputted to the space light branching part 124H. The half-mirror 124H used as a part of the light branching unit 60 reflects a part of the light with a reflecting film generated in the single surface side of the glass and transmits the remaining light through the glass. The signal light having passed the glass passes through the phase adjustor 40, which is temperature-controlled with the TEC 150 and reaches the half-mirror 123H of the demodulating unit 80 after reflection with the mirror 117F.

The light reflected with the half-mirror 124H is also reflected with the mirror 116F, passes the π/2 phase difference plate 30, and then reaches the half-mirror 123H of the demodulating unit 80. Namely, a pair of the signal lights (light beams) reach respectively both surfaces of the half-mirror 123H. Referring to the side elevation of FIG. 6, setting is performed so that the phase difference of π/2 is relatively generated with the phase difference plate 30 between the light beam DwnBm and light beam UpBm and thereby control can be conducted through inclination, rotation, and temperature adjustment to generate the phase difference of almost π/2. If the phase difference of odd number times of π/2 is relatively generated in the phase difference plate 30, any problem does not exist in the operations.

In this case, a reflection film is formed in a single side (left side in the figure) of the half-mirror 124H and thereby the incident light is reflected first in the power almost equal to a half of the entire power with the reflection film. Almost all remaining lights pass the glass plate. The reflection films formed in the single sides (right side in the figure) of the half-mirror 124H and half-mirror 123H are formed in the opposite sides with each other. Accordingly, the light beams branched to two light beams with the half-mirror 124H pass, as long as the identical distance, the glasses and reflection films of the half-mirrors 124H and 123H. Therefore, an intensity modulated light signals can be obtained through interference at the half-mirror 123H of the two light beams well balanced in loss and temperature characteristic of phase. Two demodulated light signals can be converted to corresponding electrical signals with the photodiode in the photoelectrical converting unit (light detecting unit) 90. Moreover, dependence on polarization dependency of the half-mirror 123H can be reduced easily by setting an angle of the half-mirror 123H to 5 degrees to 15 degrees.

However, even if ratios in amount of lights in the two directions passing the half-mirror 124H are different, any particular problem does not exist when the amounts of lights in two directions passing the half-mirror 123H are finally matched with each other.

As explained above, the relative delay time difference in the length of light paths branched with the half-mirror 124H by making larger the incident angle to the mirror 117F can be matched with that enough for almost one symbol of the DQPSK modulated signal. Moreover, a phase difference between the light beams DwnBm and UpBm can be set and maintained to almost π/2 by using the phase difference plate 30 and TEC 150. The phase difference between the light beams DwnBm and UpBm can be accurately adjusted to the odd number times of almost π/2 of the signal light wavelength by providing the TEC to the phase adjustor 40.

As explained above, the adjusting point of the DQPSK optical receiver can be focused to only one point and thereby reliability, controllability and productivity can also be improved by using the phase adjustor 40 and phase difference plate 30 common to the light beams DwnBm and UpBm.

Moreover, transmitting characteristics of at least two half-mirrors through which the light signals pass serially can be improved by forming the reflection film of each half-mirror is formed oppositely with each other.

Here, it is also possible to provide the phase adjustor 40 and phase difference plate 30 so that each signal light inputted to the half-mirror 123H passes the glass in almost identical passing distance. Otherwise, it is also possible to design so that the total distance in a couple of light paths in which the light signal passes the glass plate becomes identical. With the design as explained above, dependence on temperature of the light circuit can be reduced in size easily and high quality DQPSK light signal can be demodulated.

Here, since the half-mirrors 123H, 124H, phase adjustor 40, mirrors 116F, 117F and phase difference plate 30 can be formed in a single plate to operate for both optical beams UpBm and DwnBm. Since such elements are respectively formed in a single plate, the relative delay time difference of almost one symbol and the phase difference of almost odd number times of $\pi/2$ in the DQPSK signal light in the light beams UpBm and DwnBm can be accurately set and adjusted.

Figure 7:
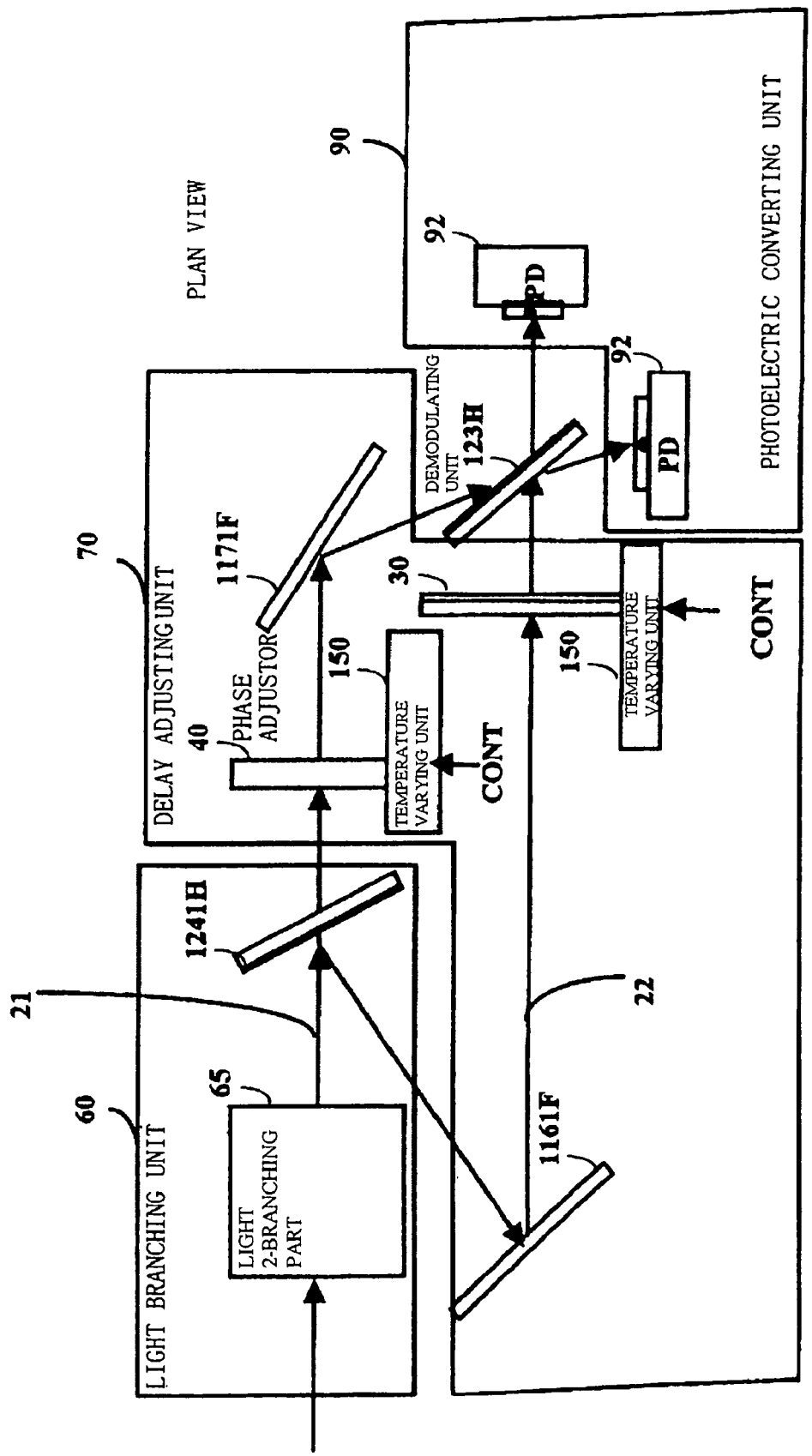
FIG. 7 is a diagram illustrating a modification example (additional number 2) of the optical receiving apparatus as the second embodiment of the present invention.

FIG. 7 is a diagram illustrating a modification example of the optical receiver of FIG. 6.

Essential difference from FIG. 6 is that a reflection angle in combination of the half-mirror 1241H and the mirror 1161F is different. Namely, in the half-mirror 124H of FIG. 6, the light beam is reflected toward the lower direction almost perpendicularly on the figure, but in the half-mirror 1241H of FIG. 7, the light beam is reflected to come close to the light branching unit 60. With such reflection, relative delay time difference of almost one symbol by the DQPSK modulation can be obtained easily and an interval between the light beam 21 and the light beam 22 can be reduced. Accordingly, the optical receiver of the present invention can be reduced in size.

Figure 8:
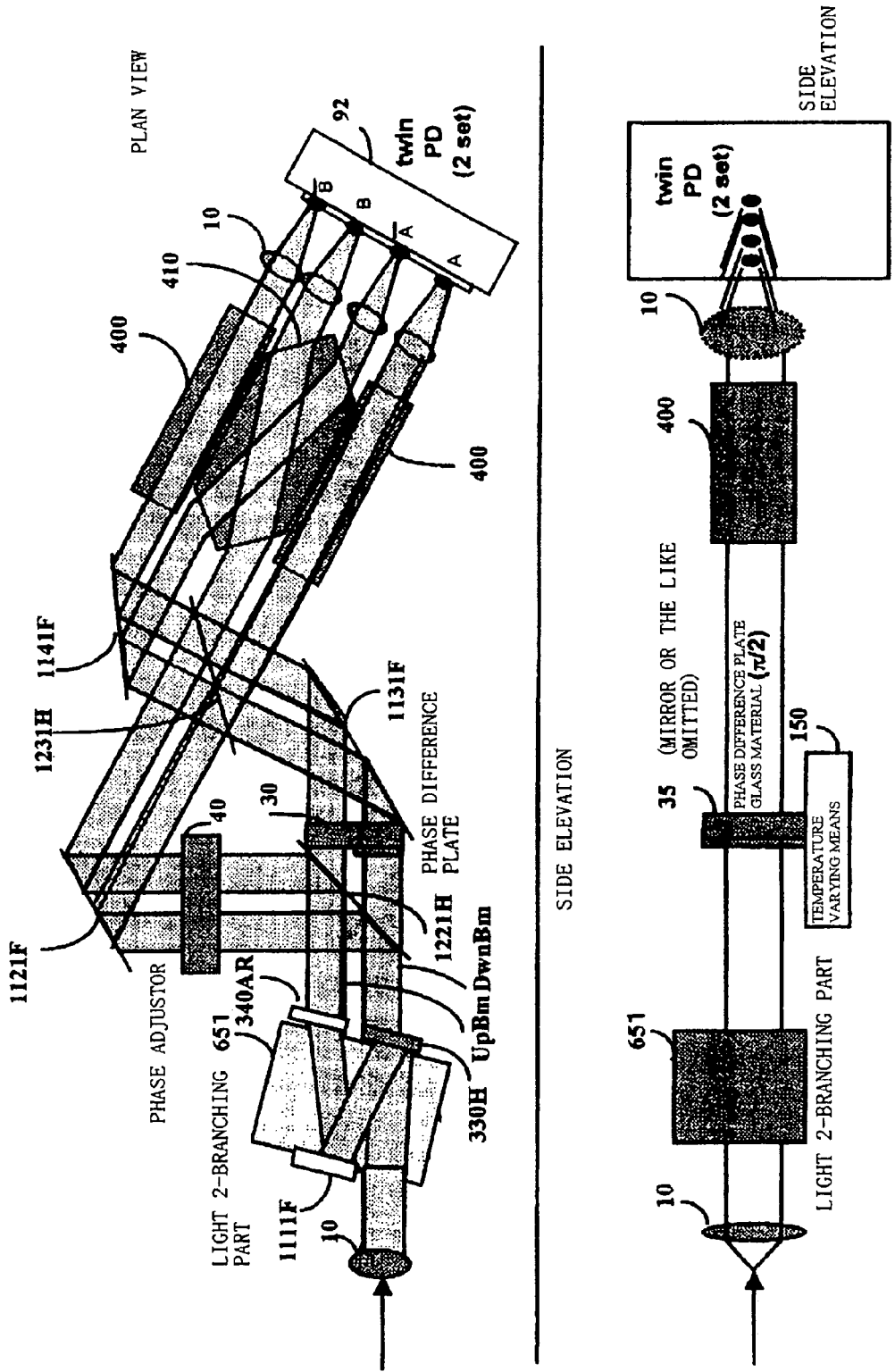
FIG. 8 is a diagram illustrating a modification example (additional number 3) of the optical receiving apparatus as the first embodiment of the present invention.

FIG. 8 is a diagram illustrating a modification example of the first embodiment for conducting the receiving process by allocating the light axes of the light beams A and B on the same plane for the spatial multiplexing of the light beams.

The principal portions of this embodiment is formed of the light branching unit, delay adjusting unit, demodulating unit, and photoelectric converting unit. As a more specific example, the light branching unit is constituted with the collimator lens 10, light 2-branching part 651 for branching the input signal light to two light beams, and half-mirror 1221H for further branching the branched light beam to two light beams. For example, in the light branching part 651, a reflection film 1111F is formed or vacuum-evaporated on a single surface of a glass block, a reflection film 330H having transmissivity of about 50% and reflectivity of about 50% is formed or vacuum-evaporated on an opposite surface, and these surfaces are coated with an anti-reflection film AR340 except for the parts of the surfaces with the reflection film 1111F and the reflection film 330H. Since the signal light is inputted to such glass block 651 via a optical fiber ferrule and the collimator lens 10, a pair of almost parallel light beams can be emitted to the half-mirror 1221H.

As the light 2-branching part 651, the light branching part 65 of FIG. 6 may be adapted. When any of the light 2-branching part 651 or light 2-branching part 65 is selected, it is suitable that any of the P wave and S wave having smaller phase difference is employed for each branched light beam.

The delay adjusting unit is constituted with the phase adjustor 40, reflection mirrors 1121F, 1131F, and the phase difference plate 30. A relative delay time difference of the branched signal light branched to two light beams with the half-mirror 1221H of the light branching unit and at the half-mirror 1231H of the demodulating unit is set as the value thereof for almost one symbol of the DQPSK signal via the reflection mirrors 1121F and 1131F. A relative phase difference of the light beams UpBm and DwnBm can be accurately adjusted to almost odd number times of $\pi/2$ through cooperation of the phase difference plate 30 and phase adjustor 40 having the fixed-phase difference.

The signal lights branched to two light beams are interfered with each other in the half-mirror 1231H and are then demodulated as the light signals. In the high-speed communication, it is desirable to replace the light paths so that the light signal A and the complementary signal A, the light signal B and the complementary signal B are respectively provided adjacently. A wiring distance of a differential receiving circuit can be shortened by providing adjacently the signal lights. With the structure of circuit as explained above, high quality and high speed modulated light signal (for example, 40 Gbps or higher) can be received easily.

The photoelectric converting unit is formed, for example, of four photodiodes. When the modulation speed allows use of avalanche photodiodes, such photodiodes may be used suitably.

The glass material 410 is used for replacing the light paths of adjacent two light beams. The glass material 400 is provided to compensate for change in the lengths of light paths by the glass material 410 so that the light path becomes identical in the length of the other light path through conversion in the atmospheric condition.

Moreover, the distance up to each light-detecting element from the half-mirror 1231H can be made identical by providing a recessed area at the mounting locations of the photodiodes of the photoelectric converting unit 92. In addition, such distance can also be made identical by adjusting the length of each glass material 400. Moreover, the distance up to each light-detecting element from the half-mirror 1231H can be made identical by changing the length of each light path of the glass material 410.

Figure 9:
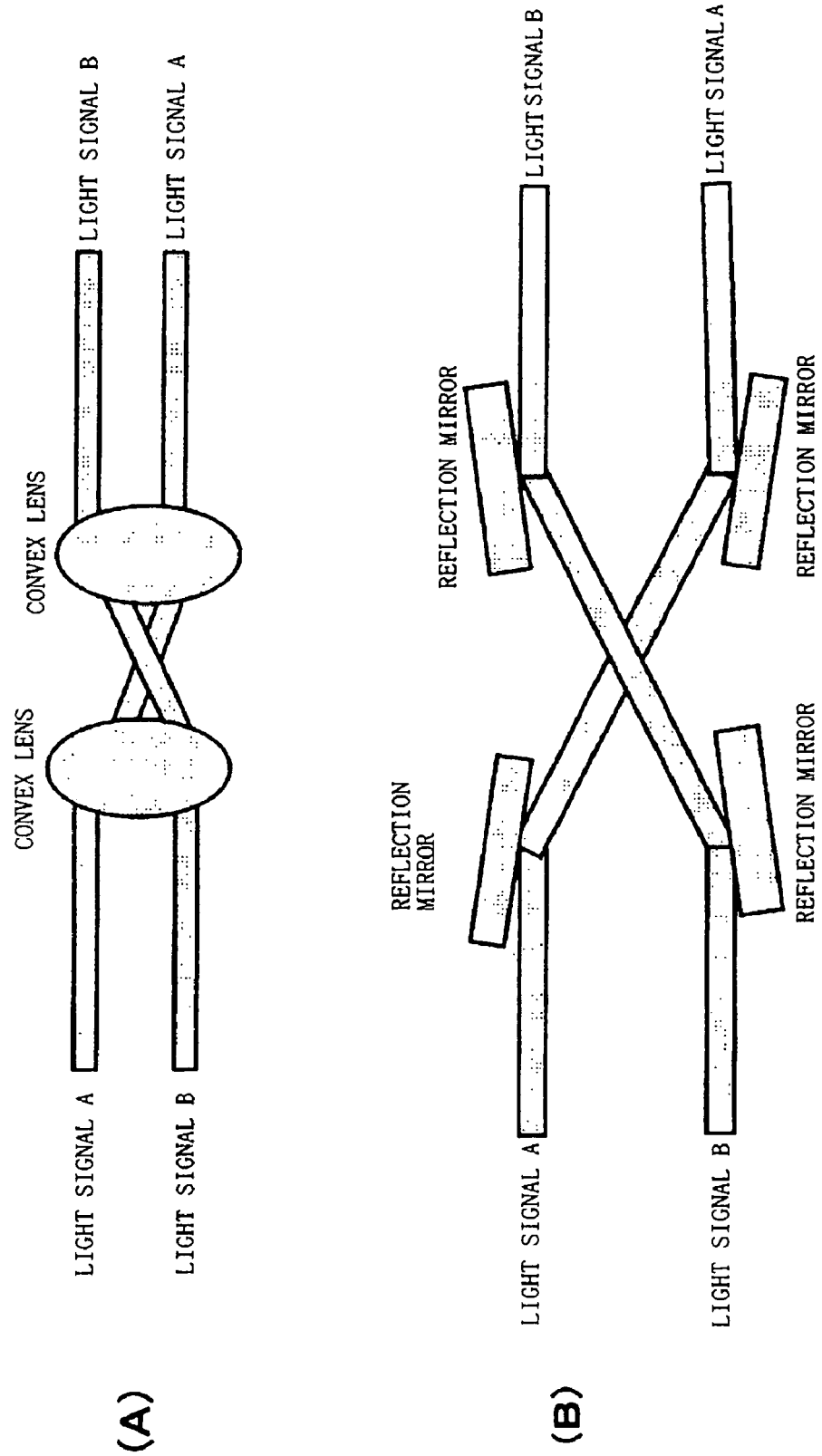
FIG. 9 is a diagram illustrating a modification example (additional number 4) of a glass material 410 for replacing two light paths.

FIG. 9 is a diagram illustrating a modification example of the glass material 410.

In this figure, according to the embodiment (A), for example, two plates of convex lenses having the identical focal distance are allocated in cascade and are allocated to result in the focal distance, which is two times the focal distance of each lens. With such lens allocation, the light paths of the light signal A and the adjacent light signal B can be replaced with each other. Moreover, the similar effect can also be obtained by using two plates of the convex lenses having different focal distances.

According to the embodiment (B), the structure to return the input light beams to the same light path through the crossing thereof may be formed, for example, using four reflection mirrors. With such allocation of mirrors, the light paths of the light signal A and the adjacent light signal B can be replaced with each other. Here, the mirror must be designed to make the phase difference as small as possible for the P polarization and S polarization of the reflected light.

Here, since each of the half-mirrors 1221H, 1231H, phase adjustor 40, mirrors 1121F, 1131F, 1141F and phase difference plate 30 are formed on a signal plane; these can operate for both light beams UpBm and DwnBm simultaneously. Since these elements are formed on a single plane, a relative delay time difference of one symbol and a phase difference in the DQPSK signal light for the light beams UpBm and DwnBm can be accurately set and adjusted.

Figure 10:
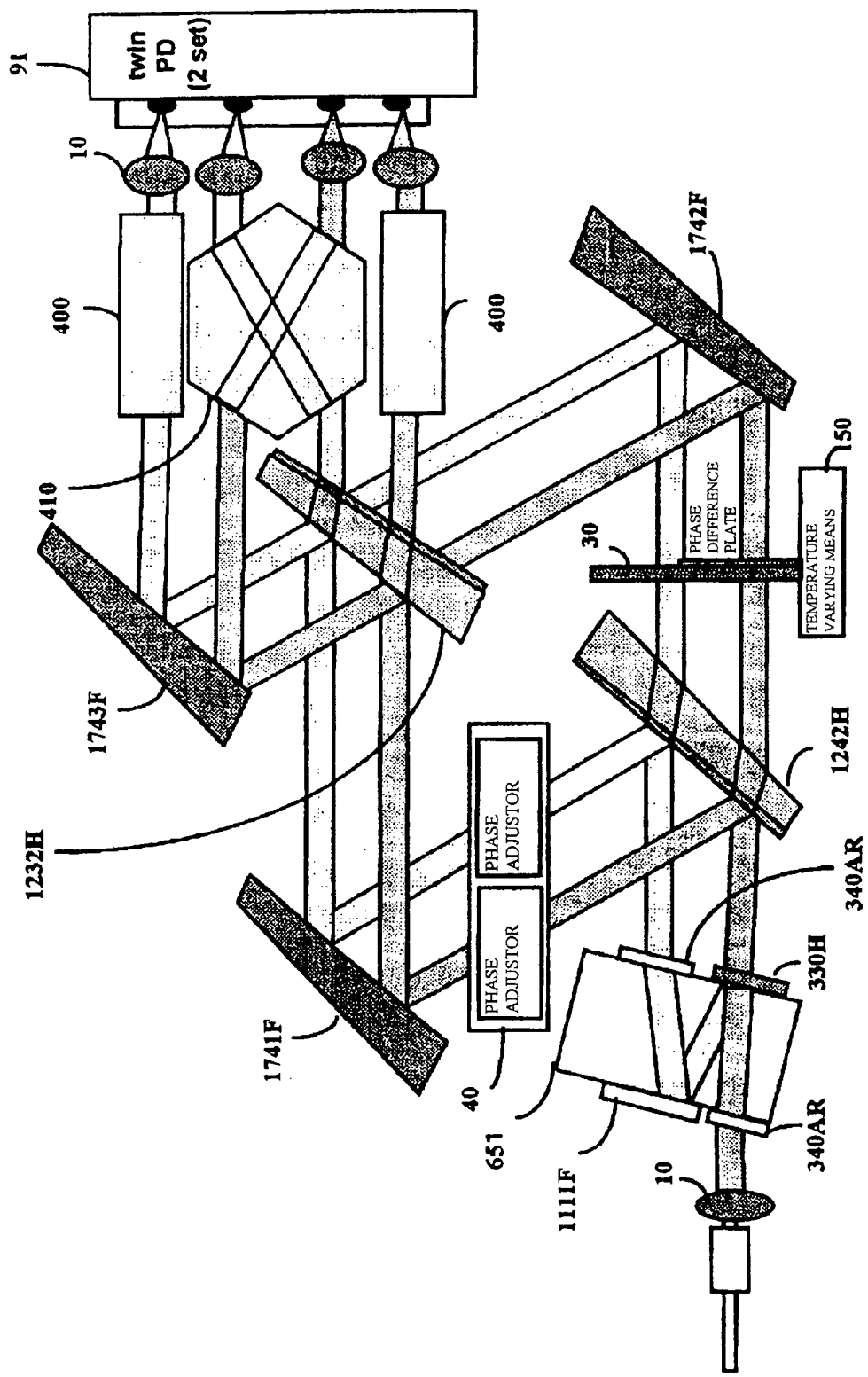
FIG. 10 is a diagram illustrating a modification example (additional number 5) of the optical receiving apparatus as a fourth embodiment of the present invention.

FIG. 10 is a diagram illustrating a modification example of the fourth embodiment of FIG. 8.

The principal part of this embodiment is formed of a light branching unit, the delay-adjusting unit, demodulating unit, and photoelectric converting unit. In more practical, the light branching unit is formed of the collimator lens 10, light 2-branching part 651 for branching the input signal light into two light beams, and half-mirror 1242H for further branching the branched light beam into two light beams. For example, the light branching part 651 is formed by forming or vacuum-evaporating a reflection film 1111F on a single surface of the glass block, forming or vacuum-evaporating a reflection film 330Ha having transmissivity of 50% and reflectivity of 50% on the opposite side surface, and then coating the both surfaces with the anti-reflection film AR340. A pair of almost parallel light beams can be emitted to the half-mirror 1242H by inputting the signal light to such glass block via the ferrule and collimator lens 10.

The delay-adjusting unit is formed of the phase adjustor 40, mirrors 1741F, 1742F and phase difference plate 30. Relative delay time difference of the signal lights at the half-mirror 1232H of the demodulating unit branched to the two signal lights with the half-mirror 1242H of the light branching unit is set to the value corresponding to almost one symbol of the DQPSK signal via the mirrors 1741F, 1742F. As in the case of FIG. 8, the relative phase difference can be precisely adjusted through cooperation of the phase difference plate 30 and phase adjustor 40 having the fixed phase difference of almost $\pi/2$ to provide the relative phase difference of the odd number times of almost $\pi/2$.

The signal lights branched to two signal lights are demodulated as the light signals through interference with the half-mirror 1232H. Here, it is desirable that the light paths are replaced with each other so that light signal A and the complementary signal light A, the light signal B and the complementary signal light B are provided adjacently. With these adjacent signal lights, the wiring of the differential receiving circuit can be shortened. Accordingly, the high speed modulated light signals (for example, 40 Gbps or higher) can be received in the higher quality using the circuit explained above.

The demodulating unit can be constituted, for example, with the half-mirror 1232H.

The photoelectric converting unit is formed of four photodiodes. When the transmission rate allows use of the avalanche photodiode, the photodiode may be used suitably.

The glass material 410 is provided to replace the light paths of the adjacent two light beams. The glass material 400 is capable of compensating for change in the length of light path by the glass material 410 to make such light path identical in length to the other light path. As a modification example of the glass material 410, the glass materials using two lenses and four mirrors are illustrated in FIG. 9. It is also possible to make identical the distance up to each light-detecting element from the half-mirror 1141F by providing a recessed portion at the mounting location of each photodiode of the photoelectric converting unit 92. Moreover, the length of each glass material 400 may be adjusted to the identical length. In addition, the distance up to each light-detecting element from the half-mirror 1232H can be adjusted equally by changing length of light path of the glass material 410.

In this embodiment, the half-mirrors 1242H, 1232H and mirrors 1741F, 1742F and 1743F do not use the plate with homogeneous thickness. As an alternative, a wedge type prism (called a wedge prism) is used. As the inclination angle, only one degree is sufficient. Since the signal light can be reflected in the direction different from the light path of signal light with such inclination angle, multiple reflections and interferences may be eliminated and deterioration in the quality of light signal can be prevented. Similarly, it is also allowed to give similar inclination to the glass material 400.

Here, since the half-mirrors 1232H, 1242H, phase adjustor 40, mirrors 1741F, 1742F and 1743F, and phase difference plate 30 can be formed in a single plate, these elements can be operated for both light beams UpBm and DwnBm passing through the coating 340AR and the half-mirror 330H. Since these elements are formed on a single plane, the relative delay time difference of one symbol and the phase difference in the DQPSK signal light for the light beams UpBm and DwnBm can be set and adjusted precisely.

Figure 11:
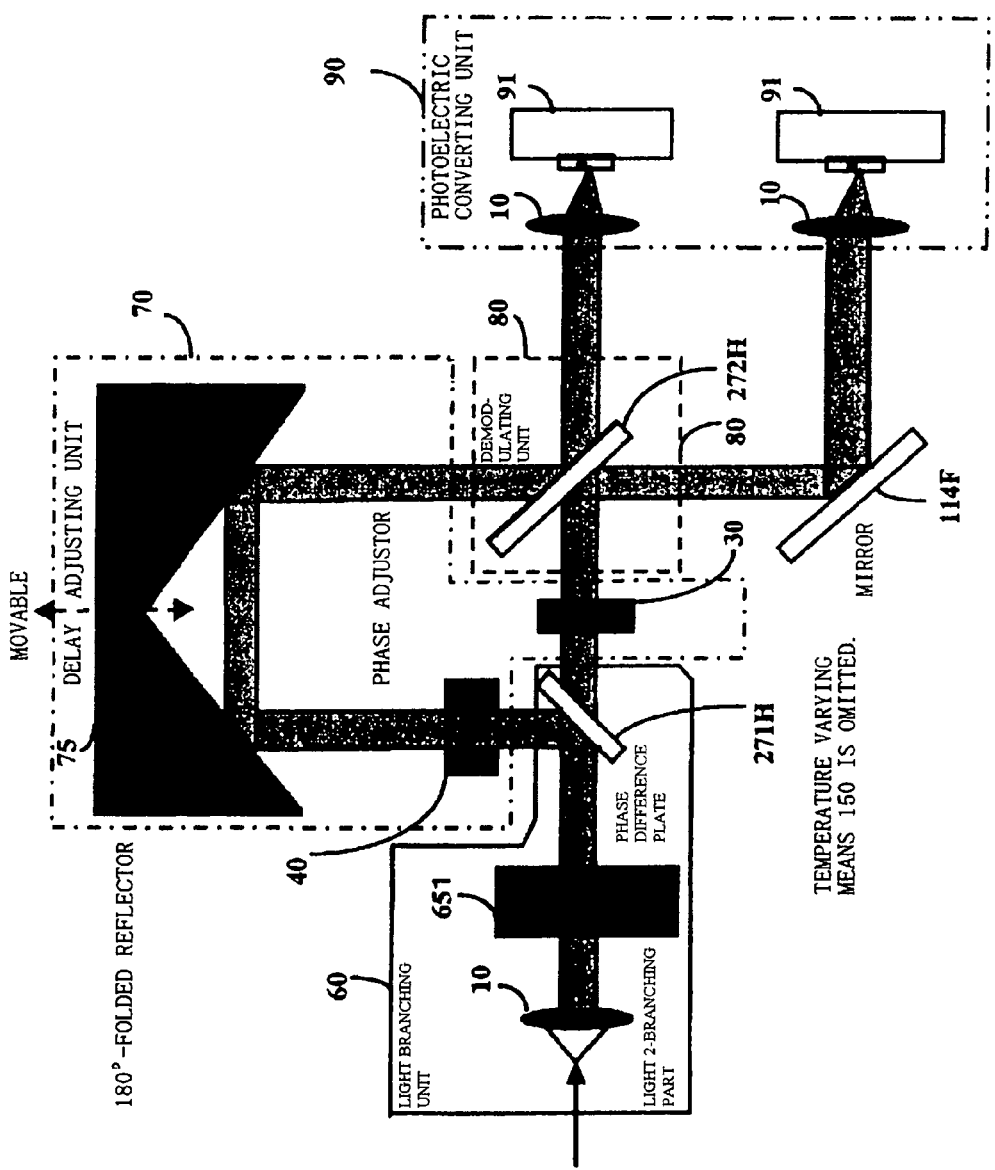
FIG. 11 is a diagram illustrating a modification example (additional number 6) of the optical receiving apparatus as the first embodiment of the present invention.

FIG. 11 is a diagram illustrating a modification example of the first embodiment of FIG. 1.

The principal portion of this embodiment is formed of the light branching unit 60, delay adjusting unit 70, demodulating unit 80, and photoelectric converting unit (light detecting unit) 90. In more specific structure example, the light branching unit 60 is constituted with the collimator lens 10, light 2-branching part 651, half-mirror 271H for further branching the branched signal light into two signal lights. For example, as the light branching part 651, the element identical to the light branching part 65 may be used. A pair of almost parallel beams can be emitted to the half-mirror 271H by inputting the signal light to such light branching part 651 via the collimator lens 10.

The delay-adjusting unit 70 is formed of the phase adjustor 40, a 180 degrees-folded reflector 75, and the phase difference plate 30. Relative delay time difference of the signal light branched to two signal lights with the half-mirror 271H is set to a value corresponding to almost one symbol of the DQPSK signal via the 180 degrees-folded reflector 75 (for example, a 180 degrees-folded reflector, a rectangular prism, or corner cube prism may also be used). Setting is made to generate a relative phase difference of almost $\pi/2$ with the phase difference plate 30 between the light beams DwnBm and UpBm (FIG. 8) branched to two light beams with the light 2-branching part 651 and such phase difference is controlled to almost $\pi/2$ through inclination, rotation, and temperature adjustment. Any problem does not exist even when the phase difference of almost odd number times of $\pi/2$ is generated in the phase difference plate 30.

As explained above, the phase difference plate 30 having the fixed phase difference of almost $\pi/2$ which results in relative phase difference of almost odd number times of $\pi/2$ of the signal light wavelength is provided and the phase adjustor 40 can precisely adjust the relative phase difference to almost $\pi/2$. The DQPSK modulated signal corresponding to one symbol can be generated as the relative delay time difference of a couple light paths between the half-mirrors 271H and 272H by shifting the position of the 180 degrees-folded reflector 75. When this 180 degrees-folded reflector 75 has sufficiently high position setting accuracy, the phase adjustor 40 is unnecessary. The 180 degrees-folded reflector 75 reflects a couple of signal lights (branched light beams UpBm and DwnBm).

The demodulator 80 is formed of the half-mirror 272H which inputs the two signal lights from both surfaces and the intensity modulated signal is obtained as the complementary two light signals through the interference of a couple of signal lights.

The photoelectric converting unit (light detecting unit) 90 is formed of four photodiodes. Two couples of the complementary two signals from the demodulating unit 80 are respectively received with the differential light-detecting circuit by four photodiodes and thereby two couples of electrical signals can be outputted. When the transmission rate allows the use of the avalanche diodes having higher receiving sensitivity, such avalanche diode may be used suitably.

Since the half-mirrors 271H, 272H, phase adjustor 70, mirror 114F, and phase difference plate 40 are formed on a single plane for operations of both light beams UpBm and DwnBm as explained above, the relative delay time difference corresponding to one symbol and the phase difference in the DQPSK signal light can be accurately set and adjusted for the light beams UpBm and DwnBm. The folded reflector 75 can also operate for both light beams UpBm and DwnBm.

Figure 12:
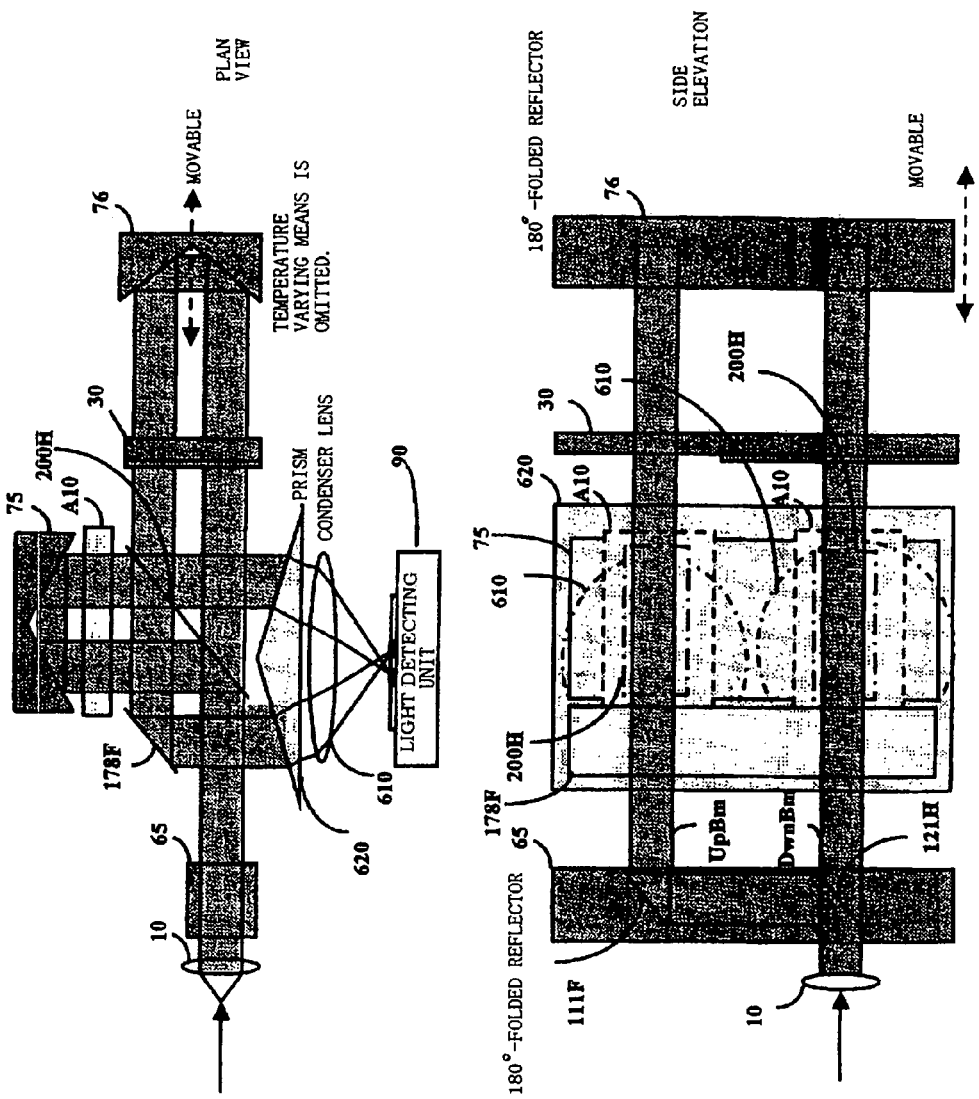
FIG. 12 is a diagram illustrating a modification example (additional number 7) of the optical receiving apparatus as a sixth embodiment of the present invention.

FIG. 12 is a diagram illustrating a modification example of the sixth embodiment.

The principal portion of this embodiment is formed of the light branching unit, delay-adjusting unit, demodulating unit and photoelectric converting unit. More specifically, the light branching unit is formed of the collimator lens 10, light 2-branching part 65 for branching the input signal light into two signal lights, and the half-mirror 200H for further branching the branched signal light into two signal lights. For example, as the light branching part 65, the branching part, which is identical to that (65) of FIG. 6 can be used. Otherwise, the light branching part 651 in FIG. 10 can also be used. The light branching part 65 receives the signal light via the collimator lens 10 and therefore can emit a pair of almost parallel beams to the half-mirror 200H.

The delay-adjusting unit is formed of the phase adjustor A10, 180 degrees-folded reflectors 75, 76 and phase difference plate 30. In the half-mirror 200H, relative delay time difference of each signal light branched to two signal lights with the left side of the half-mirror 200H is set to the delay time difference corresponding to one symbol of the DQPSK signal via the 180 degrees-folded reflectors 76 (180 degrees-folded reflector 75 may also used as the alternative). As the 180 degrees-folded reflector, the 180 degrees-folded reflecting mirror, rectangular prism, and corner cube prism may be used.

Between the light beams DwnBm and UpBm, which have been branched with the light 2-branching part 65, the phase difference plate 30 is set to generate relative phase difference of almost $\pi/2$ and the control is possible through inclination, rotation, and temperature adjustment to generate the phase difference of almost $\pi/2$ as explained above. Any problem does not exit in operations of the phase difference plate 30 even when relative phase difference of almost odd number times of $\pi/2$. As explained above, the phase difference plate 30 including the fixed phase difference of $\pi/2$ is provided in order to result in the relative phase difference of odd number times of almost $\pi/2$ of the signal light wavelength and the relative phase difference of almost $\pi/2$ can precisely be adjusted with the phase adjustor A10.

The demodulating unit is provided with the half-mirror 200H and the two signal lights reflected with the folded reflectors 75, 76 are interfered in the right side of the figure of the half-mirror 200H and is then demodulated as the two couples of complementary intensity modulated light signals. The demodulated light signal A and complementary signal A, light signal B and complementary signal B are sent to the photoelectric converting unit (light detecting unit) 90 passing through the prism 620, condenser lens 610. With these prism 620 and condenser lens 610, the distance between a couple of photodiodes can be reduced closely. A set of the prism 60 and condenser lens 610 is called an optical system. As explained above, the ultra high-speed receiving circuit (for example, 40 Gbps or more) can be designed easily by closely reducing the distance explained above.

Figure 13:
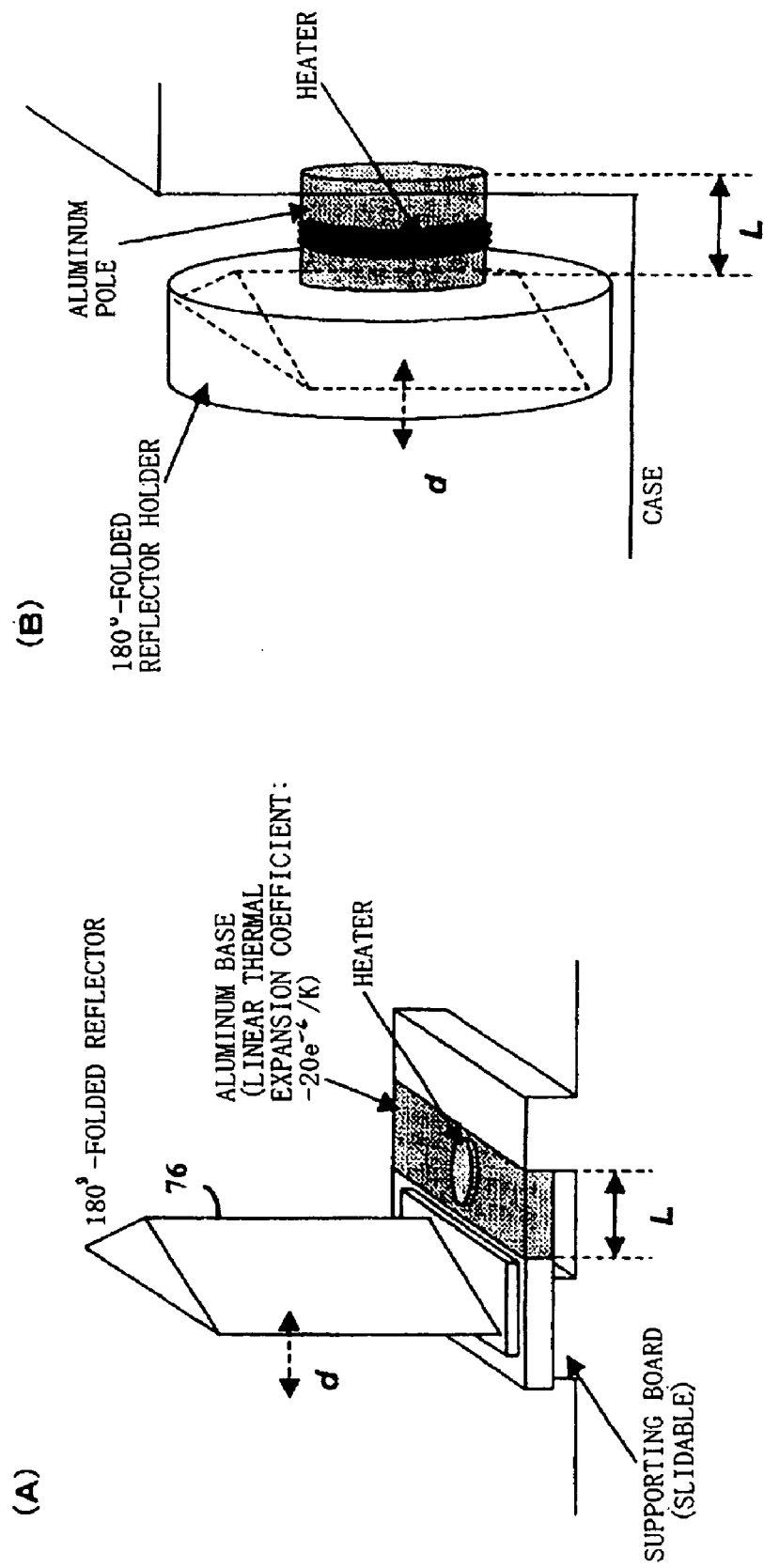
FIG. 13 is a diagram illustrating an example of movement of a phase adjustor with thermal expansion of a medium.

When the lengths of a couple of light paths to the half-mirror 200H and the photoelectric converting unit (light detecting unit) 90 are compared, the path via the mirror 178F is longer. Accordingly, a glass material can be inserted into the shorter light path to compensate the difference in the optical path length. Otherwise, it is also possible to make identical the length by allowing the shorter light path to pass a plurality of reflectors (for example, reflecting mirror). Otherwise, such distance can also be adjusted to become identical using the electric circuit after the light detection. FIG. 13 is a diagram for explaining an example where the 180 degrees-folded reflector 76 is used as the phase adjustor.

In the embodiment of FIG. 13(A), the 180 degrees-folded reflector (for example, 180 degrees-folded reflecting mirror, rectangular prism, corner cube prism or the like may also be used) is operated in conjunction with a fixed base and the 180 degrees-folded reflector 76 is moved as an example in the right and left directions on the figure by temperature control of the base using a heater.

Numerical data will be indicated below as the basic data.

Length L of thermal expansion material (aluminum)=2 mm

Temperature variable width by electric heater=20°

Amount of movement d of 180 degrees-folded reflector=20e−6×4e−3×20=1.6e−6 [m].

Variable amount of length of the light path between interferometer arms is doubled because of up- and down-light paths.

Accordingly, the phase adjustment amount of $4\pi$ radians or more can be realized for the length of light path of about 1.5 μm.

FIG. 13(B) is the embodiment where an electric heater is inserted in an aluminum pole and amount of movement of the 180 degrees-folded reflector is controlled by utilizing the thermal expansion by the temperature control of this heater. The essential characteristic is identical to that of (A), but this embodiment can be used selectively in accordance with the vacant space of the apparatus.

Figure 14:
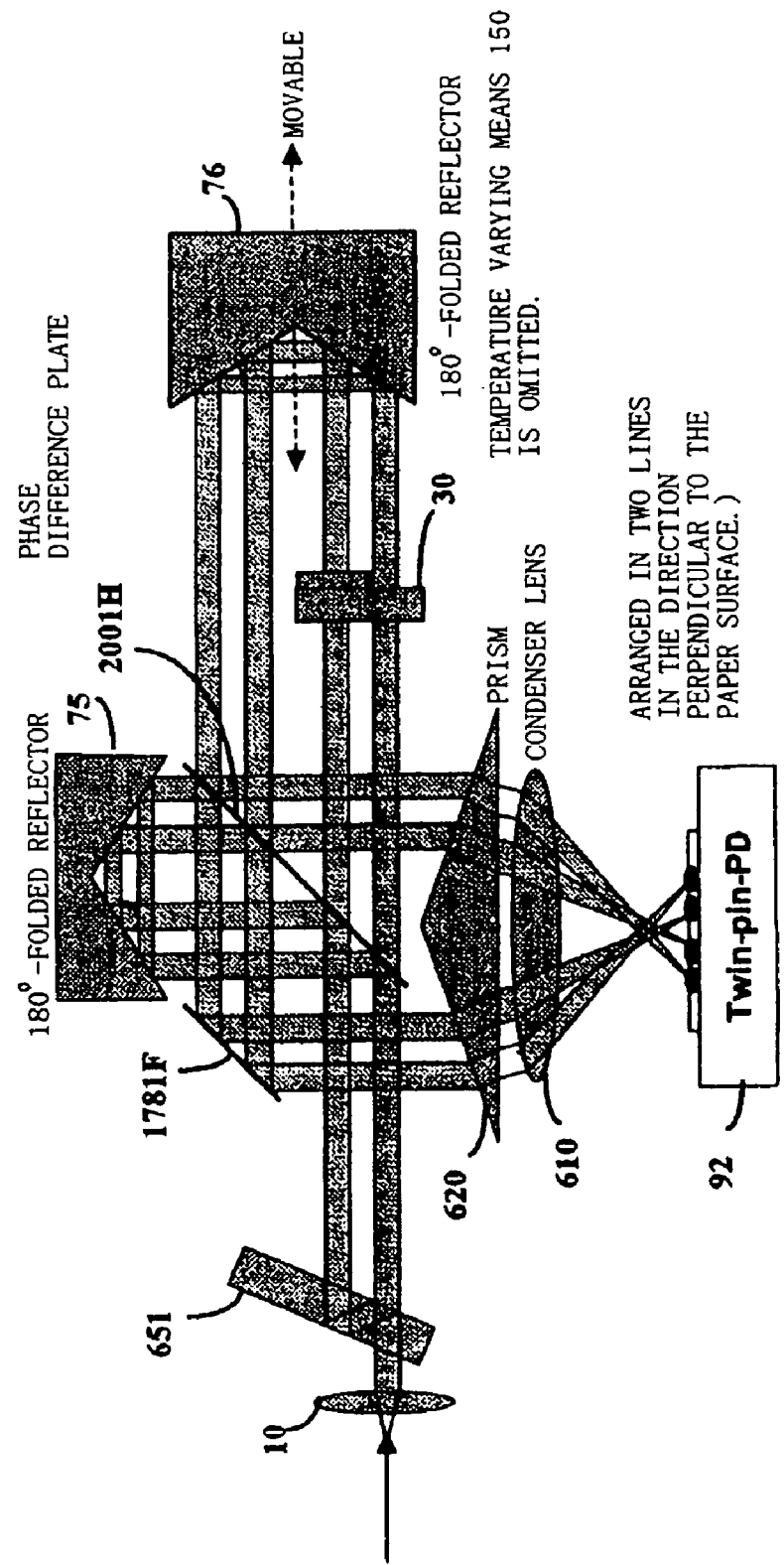
FIG. 14 is a diagram illustrating a modification example (additional number 8) of the optical receiving apparatus as a seventh embodiment of the present invention.

FIG. 14 is a diagram illustrating a modification example of the seventh embodiment.

The sixth embodiment of FIG. 12 is formed using two plates of half-mirror but this embodiment can be formed with only one half-mirror. Namely, in the embodiment explained previously, the signal light is branched to four signal lights (two pairs of signal lights) with the light branching part 65 and the left side (on the figure) of the half-mirror 200H, and a pair of signal lights are reflected with any of the 180 degrees-folded reflectors and are then demodulated as the intensity modulated light signals through interference in the upper right side of the figure of the half-mirror 200H.

In this embodiment, the signal light is branched to four signal lights (two pairs of signal lights) with the light branching part 651 and the left side (on the figure) of the half-mirror 200H. The two pairs of signal lights branched are then reflected with the folded reflectors (the 180 degrees-folded reflector, rectangular prism, and corner cube prism may also be used) 75, 76 and one of the two pairs of signal lights can be set to the delay time difference corresponding to one symbol in the DQPSK modulated signal in accordance with difference in the distance of the folded reflectors 75, 76. Between the light beams DwnBm and UpBm branched to two light beams with the light 2-branching part 65, setting is made to generate the relative phase difference of about $\pi/2$ with the phase difference plate 30 and accordingly control can also be made through inclination, rotation, and temperature control to generate the phase difference of almost $\pi/2$ as explained above. Any problem does not exist in the operation of the phase difference plate 30 even when the relative phase difference of almost odd number times of $\pi/2$ is generated. (Refer to FIG. 20.)

As explained above, the phase difference plate 30 having the fixed phase difference of almost $\pi/2$ is introduced to provide relative phase difference of almost odd number of times of $\pi/2$ of the signal light wavelength and the relative phase difference of almost $\pi/2$ can be adjusted precisely by controlling, for example, on the basis of the bit error rate, the amount of movement of the folded reflector 76 due to the thermal expansion.

The light signal A, complementary light signal A, light signal B, and complementary light signal B are obtained with the interference of two pairs of signal lights branched into two signal lights in the right side (on the figure) of the half-mirror 2001H and the demodulated four light signals are then converted to the electrical signals with the differential light-detecting circuit 92 of the photoelectric converting unit passing the prism 620 and condenser lens 610.

Here, it is also possible that a 45 degrees-mirror is provided between the Twin PD and condenser lens 610 of the differential light-detecting circuit and the substrate of twin-pin-PD×2 can also be allocated in parallel to the figure by falling the light beam in the perpendicular direction.

In this embodiment, since a less number of components are used, it is possible to attain the merit that cost reduction can be realized, size reduction can also be realized and the adjusting points can be reduced. The function identical to that of the phase adjustor A10 (FIG. 12) can also be attained by controlling the amount of movement of the folded reflector 76 of FIG. 13, for example, through the thermal expansion.

Figure 15:
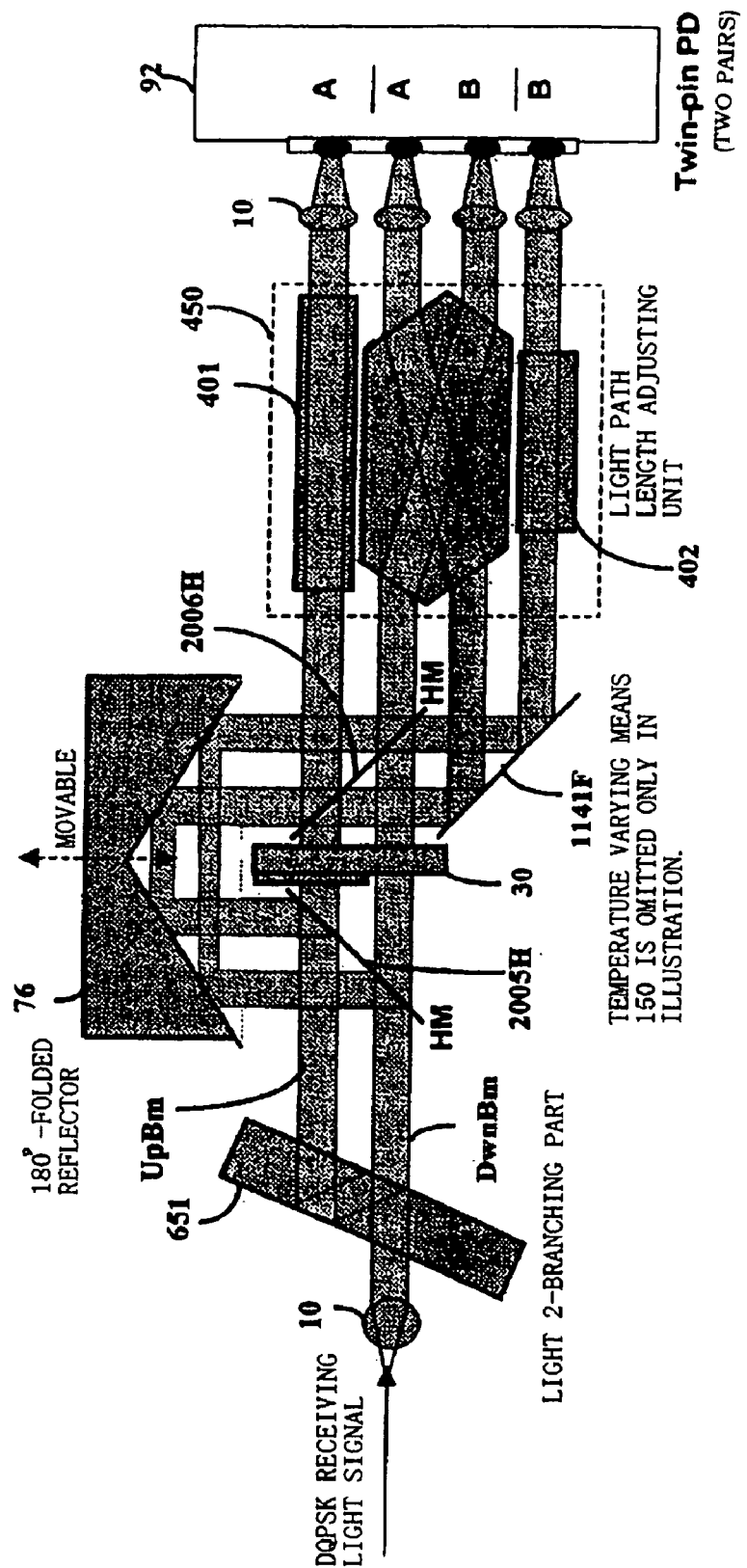
FIG. 15 is a diagram illustrating a modification example (additional number 9) of the optical receiving apparatus as the sixth embodiment of the present invention.
Figure 17:
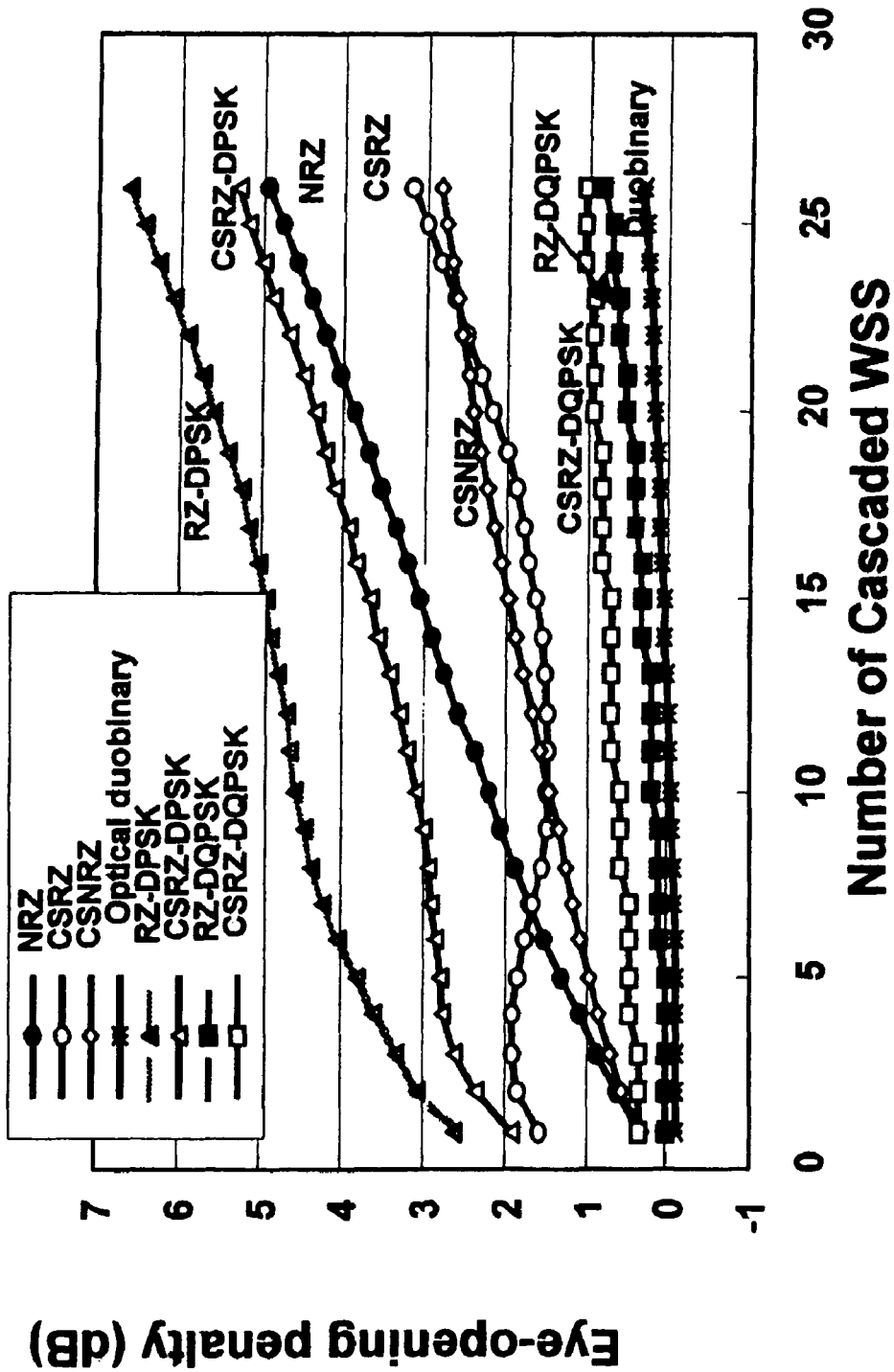
FIG. 17 is a diagram illustrating simulation result for transmitting tolerance to a concatenated wavelength combining and branching filters, e.g. OADM.
Figure 18:
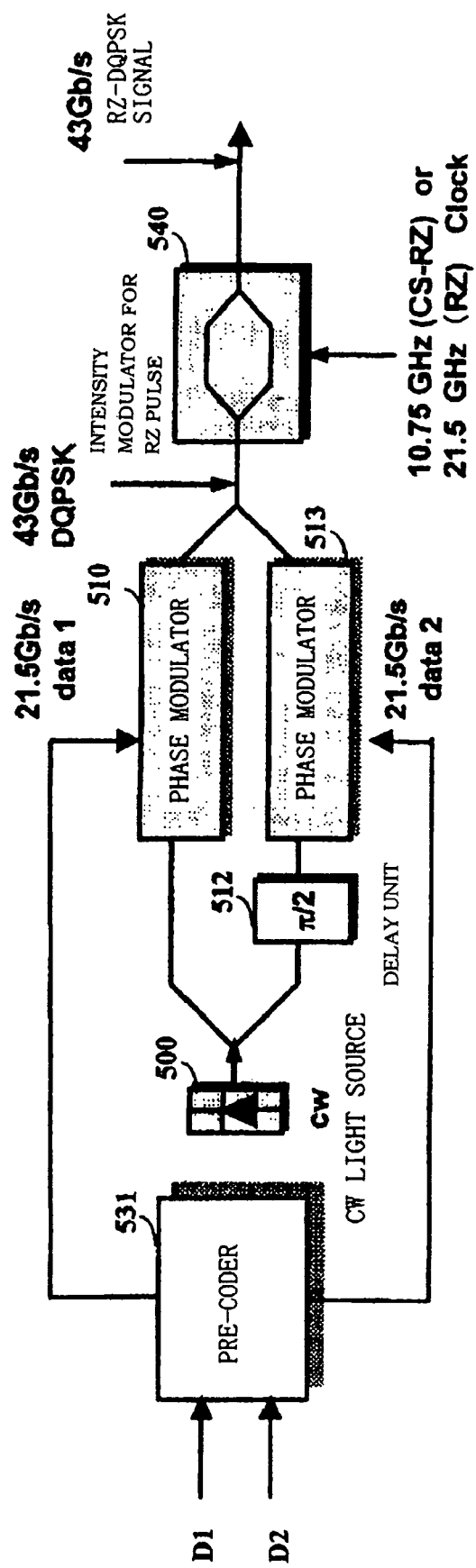
FIG. 18 is a diagram illustrating a structural example of background art of a DQPSK optical transmitting apparatus.
Figure 19:
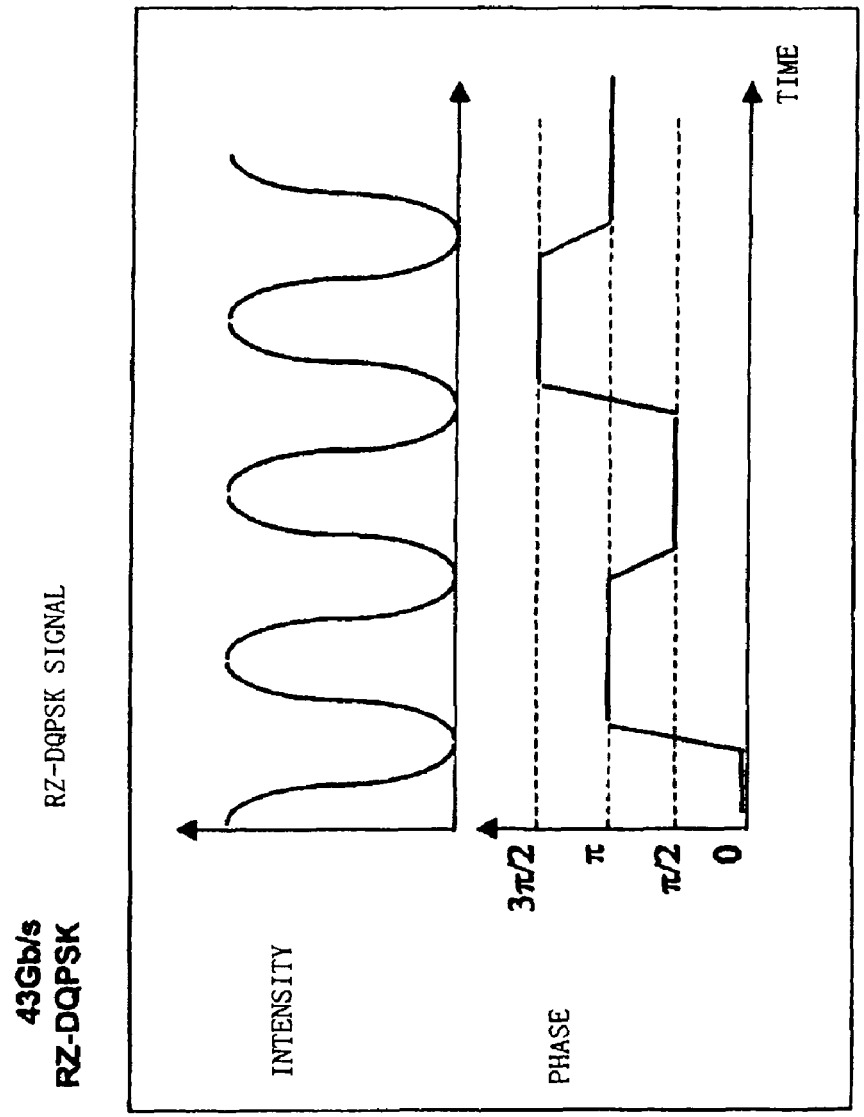
FIG. 19 is a diagram illustrating phase and intensity waveforms of the RZ-DQPSK light signal in temporal domain.

FIG. 15 is a diagram illustrating a modification example of the sixth embodiment.

The sixth embodiment of FIG. 12 has formed the principal portion with a plate of half-mirror and a couple of 180 degrees-folded reflectors. However, the principal portion of this embodiment is formed of a couple of half-mirrors and one 180 degrees-folded reflector.

In this embodiment, the principal portion is formed of the light branching unit, delay-adjusting unit, demodulating unit and photoelectric converting unit. The light branching unit is formed of the light 2-branching part 651 and half-mirror 2005H.

The delay-adjusting unit is formed of the 180 degrees-folded reflector 76 and phase difference plate 30. As the 180 degrees-folded reflector 76, the 180 degrees-folded reflecting plate consisting of two or more reflecting plates, rectangular prism, and corner cube prism can be used. Moreover, the reflecting means which can realize folded reflection of 180 degrees for the incident light with the reflector which is formed by cutting a rectangular parallelepiped glass material into the V-shape groove or inverse trapezoidal groove and then vacuum-evaporating a reflection film thereto.

In this embodiment, the signal light is power-splitted into four signal lights (two pairs of signal lights) with the light branching part 651 and half-mirror 2005H. One pair of two pairs branched by the delay adjusting unit is reflected with the folded reflector 76 and is then inputted to the half-mirror 2006H. The other pair of signal lights is incident to the half-mirror 2006H passing the half-mirror 2005H. With difference in the length of light path up to the half-mirror 2005H, folded reflector 76, half-mirror 2006H and in the length of light path up to the half-mirror 2006H from the half-mirror 2005H, the delay time difference corresponding to almost one symbol of the DQPSK modulated signal can be generated, in regard to one pair of two pairs of signal lights, and moreover the signal light wavelength phase difference between two pairs of signal lights can be set to almost $\pi/2$ with the phase difference plate 30 (refer to FIG. 20). One signal light and the other signal light are interfered with each other and demodulated as the intensity modulated light signals.

However, since length of light path to each light-detecting element from the half-mirror 2006H is different, it is desirable that the length is set identically. The light path length adjusting part 450 is structured with a glass material, which is manufactured to make almost identical the propagation time up to each light-detecting element. The complementary two pairs of light signal A, complementary light signal A, light signal B, complementary light signal B can be converted to the electrical signals with the differential light-detecting circuit by causing the demodulated light signals to pass such glass material.

This embodiment can provide the merits that a less number of components are used, low manufacturing cost can be realized, size reduction can also be achieved, and adjusting points can be reduced. Moreover, since the input side and output side are far in both ends, the present invention can also provide the excellent merit of size reduction and cooperation with the other apparatus from the viewpoint of mounting.

The invention claimed is:

1. An optical receiver comprising:
    a light branching unit branching a differential M-phase shift keying signal light beam into first, second, third and fourth signal light beams,
    a delay adjusting unit relatively giving a delay time difference of one symbol between the first signal light beam and the second signal light beam and between the third signal light beam and the fourth signal light beam and also giving a relative phase difference of almost odd number times of $\pi/2$ in signal light wavelength between the first signal light beam and the third signal light beam, and thereafter outputting the first, second, third and fourth signal light beams,
    a demodulating unit outputting at least two demodulated light signals through respective interferences, on one common plane, between the first signal light beam and the second signal light beam output from the delay adjusting unit, and between the third signal light beam and the fourth signal light beam output from the delay adjusting unit, and
    at least two light detectors for converting at least two demodulated light signals of said at least two demodulated light signals output by the demodulating unit into electrical signals,
    wherein the demodulating unit is provided with a half-mirror on one plane where an interference of the first and second signal light beams and an interference of the third and fourth signal light beams are generated.

2. The optical receiver according to claim 1, wherein the delay adjusting unit is further provided with a phase difference plate to give the relative phase difference.

3. The optical receiver according to claim 2, where a temperature varying device is further provided to maintain the relative phase difference by varying temperature of the phase difference plate in accordance with optical wavelength of signal light variation.

4. The optical receiver according to claim 1, wherein the delay adjusting unit is provided with independent two reflecting surfaces, the branching unit is provided with a half-mirror, and the half-mirror of the branching unit, the half-mirror of the demodulating unit and the reflecting surfaces of the delay adjusting unit have aperture areas enough for input of the first, second, third and fourth signal light beams under a space multiplexing condition.

5. The optical receiver according to claim 4, wherein the half-mirror of the branching unit is formed in a wedge type.

6. The optical receiver according to claim 1, wherein the light branching unit is further provided with a light 2-branching part and the light 2-branching part emits two pairs of almost parallel light beams to only one light branching part under a space multiplexing condition.

7. The optical receiver according to claim 1, wherein the delay adjusting unit is further provided with a phase adjuster and the phase adjuster is provided with at least two wedge plates for varying lengths of light paths through temperature control.

8. The optical receiver according to claim 1, wherein
the branching unit is provided with a half-mirror, and
a reflection film of the half-mirror of the branching unit is exclusively provided respectively at front and rear surfaces of the half-mirror of the branching unit.

9. The optical receiver according to claim 1, wherein the light branching unit and demodulating unit use a half-mirror in common and the light branching unit and the demodulating unit are each respectively provided with a half-mirror.

10. The optical receiver according to claim 9, wherein the at least two demodulated light signals outputted from the demodulating unit can be closely provided with an optical system for the at least two light detectors.

11. The optical receiver according to claim 9, wherein the at least two demodulated light signals outputted from the demodulating unit reach the at least two light detectors through replacement with each other with an optical system.

12. An optical receiver comprising:
a light branching unit branching a differential M-phase shift keying signal light into first, second, third and fourth signal light beams,
a delay adjusting unit relatively generating a delay time of almost one symbol between the first signal light beam and the second signal light beam, generating a delay time difference of almost one symbol between the third signal light beam and the fourth signal light beam, and giving a relative phase difference of almost odd number times of $\pi/2$ in signal light wavelength between the first signal light beam and the third signal light beam, and thereafter outputting the first, second, third and fourth signal light beams,
a demodulating unit outputting at least two demodulated light signals through interferences, on one common plane, between the first signal light beam and the second signal light beam output from the delay adjusting unit, and between the third signal light beam and the fourth signal light beam output from the delay adjusting unit, and
optical detectors converting at least two demodulated light signals of the at least two demodulated light signals output from the demodulating unit into electrical signals, wherein, at least one light path of a plurality of light paths up to the optical detectors from the branched first, second, third and fourth signal light beams is not reflected in an optical space, and a different light path of the plurality of light paths is reflected in the optical space,
wherein the one common plane is a half-mirror.

13. The light receiver according to claim 12, wherein the delay adjusting unit is provided with a phase controller controlling a phase difference by moving a reflecting plane almost in a right angle for a light path.

14. The light receiver according to claim 12, wherein the delay adjusting unit is provided with a phase control unit where a reflecting surface can be moved with a temperature varying device.

15. An optical demodulator comprising:
a splitter splitting a differential M-phase shift keying signal light beam into first, second, third and fourth signal light beams,
a delay adjuster relatively giving a delay time difference of a symbol between the first signal light beam and the second signal light beam, and between the third signal light beam and the fourth signal light beam, and also giving a relative phase difference of almost odd number times of $\pi/2$ in signal light wavelength between the first signal light beam and the third signal light beam on one plate, and thereafter outputting the first, second, third and fourth signal light beams, and
a demodulator outputting at least two demodulated light signals through respective interferences, on one common plane, between the first signal light beam and the second signal light beam output from the delay adjuster, and between the third signal light beam and the fourth signal light beam output from the delay adjuster,
wherein the one common plane is a half-mirror.

* * * * *